(12) United States Patent
Kim

(10) Patent No.: US 8,542,336 B2
(45) Date of Patent: Sep. 24, 2013

(54) LIQUID CRYSTAL DISPLAY AND MANUFACTURING METHOD THEREOF

(75) Inventor: Jae-Hoon Kim, Yongin-si (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 503 days.

(21) Appl. No.: 12/722,601

(22) Filed: Mar. 12, 2010

(65) Prior Publication Data

US 2011/0128486 A1 Jun. 2, 2011

(30) Foreign Application Priority Data

Nov. 27, 2009 (KR) ......................... 10-2009-0115873
Mar. 12, 2010 (KR) ......................... 10-2010-0022440

(51) Int. Cl.
*G02F 1/1337* (2006.01)
(52) U.S. Cl.
USPC .......................................................... 349/123
(58) Field of Classification Search
USPC .......................................................... 349/123
See application file for complete search history.

(56) References Cited

U.S. PATENT DOCUMENTS

| 2006/0139537 A1* | 6/2006 | Park et al. ...................... 349/123 |
| 2007/0152221 A1* | 7/2007 | Sasabayashi et al. ........... 257/59 |
| 2008/0062358 A1* | 3/2008 | Lee et al. ....................... 349/103 |
| 2008/0160222 A1* | 7/2008 | Harding et al. .............. 428/1.26 |
| 2009/0002588 A1* | 1/2009 | Lee et al. ......................... 349/42 |
| 2010/0066933 A1* | 3/2010 | Oh et al. .......................... 349/38 |
| 2010/0182512 A1* | 7/2010 | Abe et al. ...................... 348/707 |
| 2010/0208183 A1* | 8/2010 | Kim .............................. 349/124 |
| 2011/0261295 A1* | 10/2011 | Kim ................................ 349/96 |

OTHER PUBLICATIONS

You-Jin Lee et al., Fabrication of Fast Switchable Patterned Vertical-Alignment Mode Using Modified Surface with Reactive Mesogen, 2009 International Symposium, Seminar, and Exhibition, May 31-Jun. 5, 2009, TX, USA.
You-Jin Lee et al., Surface-controlled patterned vertical alignment mode with reactive mesogen, Optics Express, vol. 17, No. 12, Jun. 4, 2009, p. 10298-10303.

\* cited by examiner

*Primary Examiner* — Timothy L Rude
(74) *Attorney, Agent, or Firm* — Lexyoume IP Meister, PLLC.

(57) ABSTRACT

A liquid crystal display includes: a first panel; a second panel facing the first panel; a first electrode and a second electrode formed on the first panel; a liquid crystal layer provided between the first panel and the second panel; and a first alignment layer formed on the first panel and contacting the liquid crystal layer. The first alignment layer includes a first alignment base layer and a first alignment control agent, the first alignment base layer represents a material for vertically aligning liquid crystal of the liquid crystal layer, and the first alignment control agent comes out of the first alignment base layer and provides alignment force to the liquid crystal. Accordingly, when the liquid crystal of the IPS mode liquid crystal display has a pretilt, the liquid crystal that is near the facing panel on which a linear common electrode and a linear pixel electrode are not provided is immediately tilted according to the pretilt, and hence, the response speed is very fast and the afterimage problem of video is solved.

18 Claims, 18 Drawing Sheets

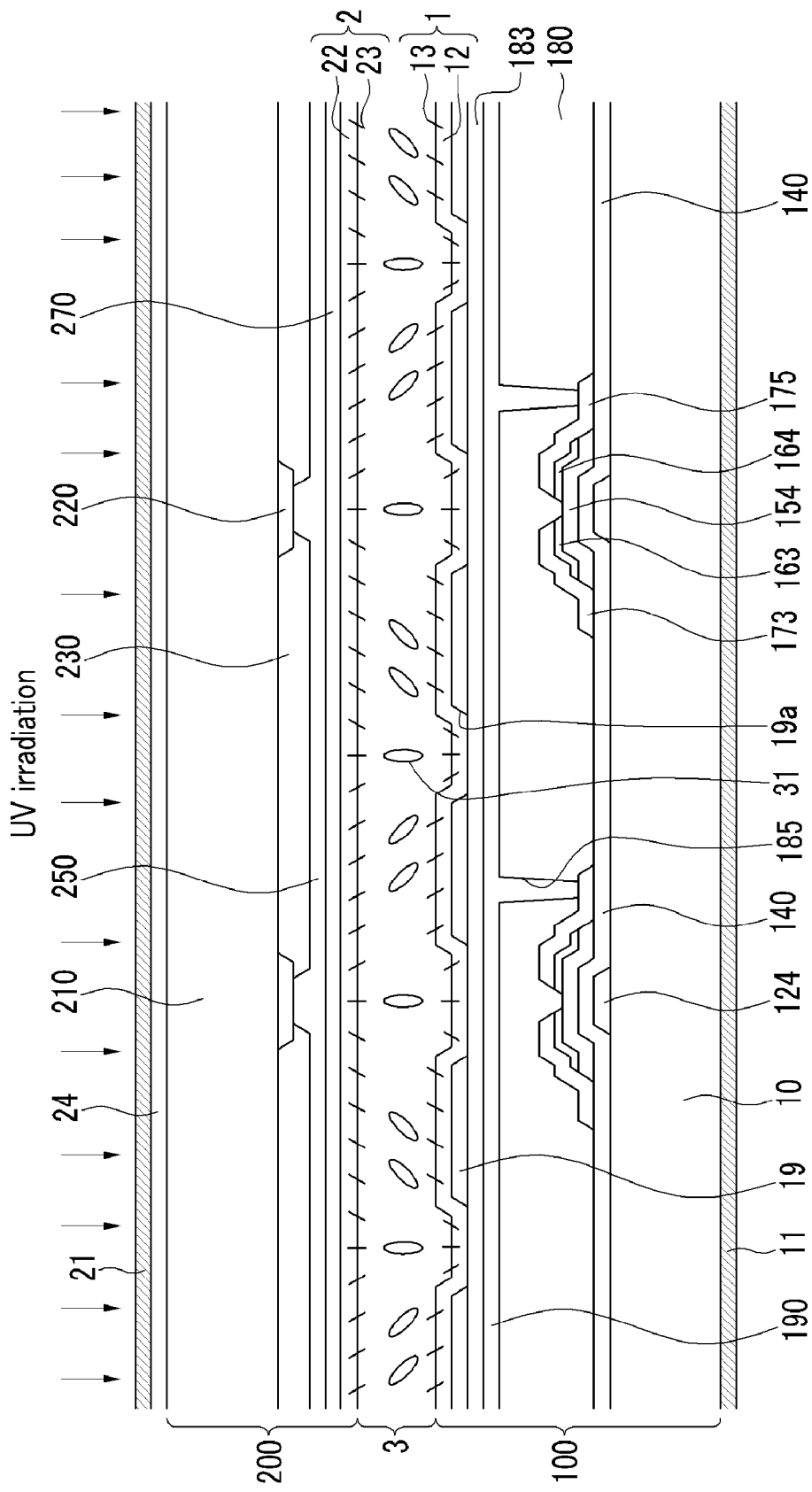

LIQUID CRYSTAL DISPLAY AND MANUFACTURING METHOD THEREOF

CROSS-REFERENCE TO RELATED APPLICATION

This application claims priority to and the benefit of Korean Patent Application Nos. 10-2009-0115873 and 10-2010-0022440 filed in the Korean Intellectual Property Office on Nov. 27, 2009 and Mar. 12, 2010, the entire contents of which are incorporated herein by reference.

BACKGROUND OF THE INVENTION (a) Field of the Invention

The present invention relates to a liquid crystal display and a manufacturing method thereof.

(b) Description of the Related Art

Various types of flat panel displays have been developed and used. Among them, the liquid crystal display is the most widely used flat panel display.

The liquid crystal display is classified as a twisted nematic (TN) mode liquid crystal display, a vertically aligned (VA) mode liquid crystal display, an in plane switching (IPS) mode liquid crystal display, and an optically compensated bend (OCB) mode liquid crystal display according to arrangement states and driving methods of liquid crystal. Regarding the liquid crystal displays, liquid crystal is initially arranged in a predetermined manner because of influence of an alignment layer or characteristics of the liquid crystal, and when an electric field is applied, the liquid crystal is arranged in another manner such that the polarization state of light that passes through the liquid crystal becomes differentiated according to the arrangement state of the liquid crystal by optical anisotropy of the liquid crystal, and the differentiation is displayed as a difference of the amount of transmitted light by using a polarizer, thereby displaying an image.

Particularly, in the IPS mode liquid crystal display, since all of common electrodes and pixel electrodes are formed on a panel, the aperture ratio is reduced and luminance is deteriorated. Also, in the IPS mode liquid crystal display, since liquid crystal that is near another panel facing the panel on which common electrodes and pixel electrodes to which a voltage is applied are formed cannot quickly react to application of the electric field, its response speed is low.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an IPS mode liquid crystal display with improved response speed, luminance, and viewing angle, and a manufacturing method thereof.

In the following detailed description, only certain exemplary embodiments of the present invention have been shown and described, simply by way of illustration. As those skilled in the art would realize, the described embodiments may be modified in various different ways, all without departing from the spirit or scope of the present invention.

An exemplary embodiment of the present invention provides a liquid crystal display including: a first panel; a second panel facing the first panel; a first electrode and a second electrode formed on the first panel; a liquid crystal layer provided between the first panel and the second panel; and a first alignment layer formed on the first panel and contacting the liquid crystal layer. The first alignment layer includes a first alignment base layer and a first alignment control agent, the first alignment base layer represents material for vertically aligning liquid crystal of the liquid crystal layer, and the first alignment control agent comes out of the first alignment base layer and provides alignment force to the liquid crystal.

The first electrode and the second electrode are formed as a plurality of bands, and are alternately disposed.

A region between the first electrode and the second electrode is divided into a plurality of domains.

The first electrode and the second electrode are in parallel with each other, and the middle parts thereof are bent.

The plurality of domains are divided into a first region and a second region, and a polar angle of the first alignment control agent provided in the first region is different from a polar angle of the first alignment control agent provided in the second region.

The first alignment control agent is generated by polymerizing a photo-polymerizable monomer or oligomer.

The liquid crystal display further includes a second alignment layer formed on the second panel and contacting the liquid crystal layer, and the second alignment layer includes a second alignment base layer and a second alignment control agent. The second alignment base layer represents material for vertically aligning liquid crystal of the liquid crystal layer, and the second alignment control agent comes out of the second alignment base layer and provides alignment force to the liquid crystal.

The second alignment control agent is generated by polymerizing a photo-polymerizable monomer or oligomer.

A polar angle of the second alignment control agent provided in the first region is different from a polar angle of the second alignment control agent provided in the second region.

The first alignment layer and the second alignment layer are optical alignment layers.

The first electrode is formed as a plurality of bands, the second electrode is formed with a continuous surface in a pixel area, and the second electrode is formed with a transparent conductor.

A region between the first electrode and the second electrode is divided into a plurality of domains, and the middle of the first electrode is bent.

The plurality of domains are divided into a first region and a second region, and a polar angle of the first alignment control agent provided in the first region is different from a polar angle of the first alignment control agent provided in the second region.

The first alignment control agent is generated by polymerizing a photo-polymerizable monomer or oligomer.

The liquid crystal display further includes a second alignment layer formed on the second panel and contacting the liquid crystal layer, and the second alignment layer includes a second alignment base layer and a second alignment control agent. The second alignment base layer represents material for vertically aligning liquid crystal of the liquid crystal layer, and the second alignment control agent comes out of the second alignment base layer and provides alignment force to the liquid crystal.

The second alignment control agent is generated by polymerizing a photo-polymerizable monomer or oligomer.

A polar angle of the second alignment control agent provided in the first region is different from a polar angle of the second alignment control agent provided in the second region.

The first alignment layer and the second alignment layer are optical alignment layers.

Another embodiment of the present invention provides a method for manufacturing a liquid crystal display including: forming a first electrode and a second electrode on a first panel; forming a first alignment layer including a first alignment ground material for vertically aligning liquid crystal on the first panel and a monomer or oligomer made of a material that is different from the first alignment ground material; forming a second panel; introducing the liquid crystal between the first panel and the second panel; and polymerizing the monomer or oligomer included in the first alignment layer by applying a first voltage between the first electrode and the second electrode and irradiating light, thereby performing first polymerization.

The first electrode and the second electrode are formed as a plurality of bands, and are alternately disposed.

A region between the first electrode and the second electrode is divided into a plurality of domains.

The first electrode and the second electrode are in parallel with each other, and the middle parts thereof are bent.

The plurality of domains are divided into a first region and a second region, and the first polymerization further includes: polymerizing the monomer or oligomer included in the first alignment layer provided in the first region through irradiation; covering the second region by using an optical mask; and polymerizing the monomer or oligomer included in the first alignment layer provided in the second region by applying a second voltage between the first electrode and the second electrode and irradiating light, wherein the first voltage is different from the second voltage.

The method further includes, before combining the first panel and the second panel, forming a second alignment layer including a second alignment ground material for vertically aligning the liquid crystal and a monomer or oligomer made of a material that is different from the second alignment ground material on the second panel.

The method includes forming a first alignment control agent by polymerizing the monomer or oligomer included in the first alignment layer, and forming a second alignment control agent by polymerizing the monomer or oligomer included in the second alignment layer.

The first electrode is formed as a plurality of bands, and the second electrode is formed as a continuous surface in a pixel area.

Yet another embodiment of the present invention provides a method for manufacturing a liquid crystal display including: forming a first electrode and a second electrode on a first panel; forming a first alignment layer including a first alignment ground material for vertically aligning liquid crystal on the first panel and a monomer or oligomer made of material that is different from the first alignment ground material; dividing a region between the first electrode and the second electrode into a plurality of domains, and dividing the domains into a first region and a second region; irradiating first light to the first region and optically aligning the alignment ground material to form an alignment base layer, and polymerizing the photo-polymerizable monomer or oligomer to form an alignment control agent; and irradiating second light to the second region and optically aligning the alignment ground material to form an alignment base layer, and polymerizing the photo-polymerizable monomer or oligomer to form an alignment control agent, wherein an irradiated amount of the first light is different from an irradiated amount of the second light.

A polar angle of the alignment control agent provided in the first region is different from a polar angle of the alignment control agent provided in the second region.

Yet another embodiment of the present invention provides a liquid crystal display including: a first panel; a second panel facing the first panel; a pixel electrode formed on the first panel and having no cutout and forming a continuous surface; a control electrode formed on the pixel electrode and including a domain dividing means for dividing a pixel area into a plurality of domains; a common electrode formed on the second panel and having no cutout and forming a continuous surface; a liquid crystal layer formed between the first panel and the second panel; and a first alignment layer formed on the first panel and contacting the liquid crystal layer, wherein the first alignment layer includes a first alignment base layer and a first alignment control agent, the first alignment base layer represents a material for vertically aligning liquid crystal of the liquid crystal layer, and the first alignment control agent comes out of the first alignment base layer and provides alignment force to the liquid crystal.

The liquid crystal display further includes an interlayer insulating layer formed between the control electrode and the pixel electrode.

The domain dividing means is a cutout.

Liquid crystal molecules of the liquid crystal layer provided at the cutout are arranged by an electric field formed between the control electrode and the common electrode.

The control electrode is formed with indium tin oxide (ITO) or indium zinc oxide (IZO).

The first alignment control agent is generated by polymerizing a photo-polymerizable monomer or oligomer.

The liquid crystal display further includes a second alignment layer formed on the second panel and contacting the liquid crystal layer, and the second alignment layer includes a second alignment base layer and a second alignment control agent. The second alignment base layer represents a material for vertically aligning liquid crystal of the liquid crystal layer, and the second alignment control agent comes out of the second alignment base layer and provides alignment force to the liquid crystal.

The second alignment control agent is generated by polymerizing the photo-polymerizable monomer or oligomer.

Yet another embodiment of the present invention provides a method for manufacturing a liquid crystal display including: forming a pixel electrode having no cutout and forming a continuous surface on a first panel; forming a control electrode having a domain dividing means for dividing a pixel area into a plurality of domains on the pixel electrode; forming a first alignment layer including a first alignment ground material for vertically aligning liquid crystal on the control electrode and a monomer or oligomer made of a material that is different from the first alignment ground material; forming a common electrode on the second panel; introducing the liquid crystal between the first panel and the second panel; and polymerizing the monomer or oligomer included in the first alignment layer by applying a first voltage between the control electrode and the common electrode and irradiating light, thereby performing first polymerization.

The method includes further forming an interlayer insulating layer between the control electrode and the pixel electrode.

The domain dividing means is a cutout.

Liquid crystal molecules of the liquid crystal layer provided at the cutout are arranged by an electric field formed between the control electrode and the common electrode.

The method further includes, before combining the first panel and the second panel, forming a second alignment layer including a second alignment ground material for vertically aligning the liquid crystal on the common electrode and the monomer or oligomer made of a material that is different from the second alignment ground material.

The method includes forming a first alignment control agent by polymerizing the monomer or oligomer included in the first alignment layer, and forming a second alignment control agent by polymerizing the monomer or oligomer included in the second alignment layer.

According to the exemplary embodiments of the present invention, when the liquid crystal has a pretilt in the IPS mode liquid crystal display, liquid crystal that is near a facing panel having no linear common electrode and linear pixel electrode immediately becomes tilted according to the pretilt, and hence, the response speed is very fast. Therefore, the problem of an afterimage in video is solved.

Further, since the linear common electrode and the linear pixel electrode are configured by a transparent conductive layer such as ITO or IZO and the liquid crystal on the linear common electrode and the linear pixel electrode has a pretilt and is immediately tilted in the direction in parallel to that of the electric field when a driving voltage is applied, liquid crystal that is helpful for image displaying is increased. Therefore, the aperture ratio is improved and the luminance is increased.

Also, since the liquid crystal has positive dielectric anisotropy, when the electric field is applied, the liquid crystal is arranged in the same direction as the electric field that is formed in the direction that is vertical to the sides of the common electrodes and the pixel electrodes. Hence, multiple alignments can be realized by arranging the liquid crystal in the different directions for respective first to fourth domains. That is, the liquid crystal is arranged with different pretilts for the first to fourth domains to thus realize multiple alignments. In this instance, since the liquid crystal has a pretilt with a predetermined polar angle, liquid crystal in all regions is tilted according to the pretilt when the electric field is applied, the alignment directions of the liquid crystal that is provided around the boundary line between domains are different for the respective domains, and hence, the multiple alignments are perfectly realized to improve the viewing angle.

In addition, when the alignment control agent has a pretilt by applying a control voltage between the control electrode and the common electrode having a cutout that functions as a domain dividing means in advance during the manufacturing process, the direction in which the liquid crystal is tilted when a driving voltage is applied between the pixel electrode and the common electrode is instantly determined by the pretilt of the previously aligned alignment control agent, thereby improving the response speed.

BRIEF DESCRIPTION OF THE DRAWINGS

FIG. 18 shows a cross-sectional view for aligning an alignment control agent to have a pretilt by irradiating ultraviolet (UV) to liquid crystal having a pretilt according to an exemplary embodiment of the present invention.

DETAILED DESCRIPTION OF THE EMBODIMENTS

Figure 1:
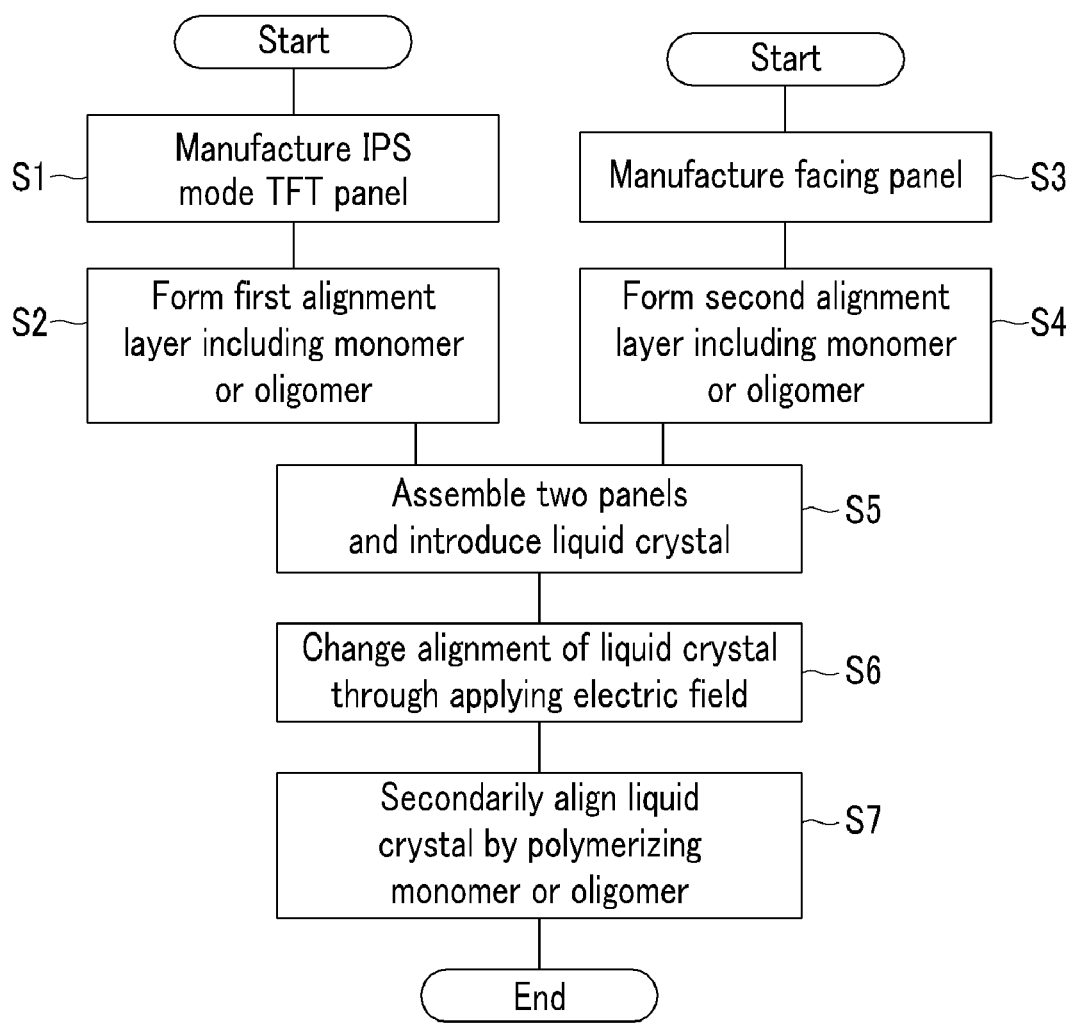
FIG. 1 shows a flowchart of a method for aligning liquid crystal according to an exemplary embodiment of the present invention.

Hereinafter, exemplary embodiments of the present invention will be described in detail referring to the accompanying drawings. The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like reference numerals designate like elements throughout the specification.

FIG. 1 shows a flowchart of a method for aligning liquid crystal according to an exemplary embodiment of the present invention.

As shown in FIG. 1, first, an IPS mode thin film transistor (TFT) panel is manufactured (S1). The IPS mode thin film transistor panel is manufactured by forming a gate line, a data line crossing the gate line, a thin film transistor having a control electrode and an input electrode connected to the gate line and the data line, a linear pixel electrode connected to an output terminal of the thin film transistor, a linear common electrode facing the linear pixel electrode, and a common electrode line for applying a common voltage to the linear common electrode on an insulation panel.

A first alignment layer including a monomer or oligomer is formed on the IPS mode thin film transistor panel (S2). The first alignment layer mixes and coats the photo-polymerizable monomer or oligomer on an alignment ground material and can be formed by hardening the alignment ground material. The alignment ground material of the first alignment layer can be formed with a material having a vertical alignment characteristic.

Therefore, since the alignment layer including the photo-polymerizable monomer or oligomer can function as an alignment layer of liquid crystal and the alignment ground material has the vertical alignment characteristic, a director of the liquid crystal is firstly aligned in the vertical direction with respect to the panel surface.

Here, a polymerization initiator can be added together with the alignment ground material and the photo-polymerizable monomer or oligomer. The polymerization initiator does not have to be added, but when it is, polymerization is quickly performed. The polymerization initiator can be a benzoyl peroxide, cumene hydroperoxide, t-butylperoctoate, dicumyl peroxide, benzoyl alkyl ether, acetophenone, benzophenone, xanthone benzoin ether, or benzyl ketal polymerization initiator in addition to methyl ethyl ketone peroxide, and they can be used individually or a mixture thereof can be used. Also, the added amount of the polymerization initiator can be less than 10 weight % for the polymerizable compound. When it is added at more than 10 weight %, the polymerization initiator functions as an impurity and deteriorates display quality of a display element.

A facing panel to be assembled to face the IPS mode thin film transistor panel is manufactured (S3). A color filter and a light blocking member can be formed on the facing panel.

Next, a second alignment layer including a monomer or oligomer is formed on the facing panel (S4). The second alignment layer can be formed by mixing and coating the photo-polymerizable monomer or oligomer on the alignment ground material, and hardening the alignment ground material. The alignment ground material of the second alignment layer can be formed with a material having a vertical alignment characteristic. Therefore, since the alignment layer including the photo-polymerizable monomer or oligomer can function as an alignment layer of liquid crystal and the alignment ground material has the vertical alignment characteristic, a director of the liquid crystal is firstly aligned in the vertical direction with respect to the panel surface.

Here, a polymerization initiator can be added together with the alignment ground material and the photo-polymerizable monomer or oligomer. The polymerization initiator does not need to be added, but when it is, polymerization is quickly performed.

The IPS mode thin film transistor panel and the facing panel are assembled, and liquid crystal is introduced between the two panels (S5).

Here, introduction of the liquid crystal is performed by interposing liquid crystal between the two panels having an alignment layer including the photo-polymerizable monomer or oligomer. In this instance, the photo-polymerizable monomer or oligomer can be added and interposed to the liquid crystal.

Next, alignment of liquid crystal is changed by applying an electric field to the liquid crystal (S6). Applying of the electric field to the liquid crystal is performed by applying a voltage between the linear pixel electrode and the linear common electrode or applying a voltage between electrodes that are installed outside. The alignment of liquid crystal caused by applying the electric field is changed according to dielectric anisotropy of the liquid crystal, and the liquid crystal having positive dielectric anisotropy is tilted in the direction in parallel to the electric field, while the liquid crystal having negative dielectric anisotropy is tilted in the direction that is vertical to the electric field. Also, the degree of changed alignment of liquid crystal is variable by the intensity of the electric field.

Accordingly, the liquid crystal is secondarily aligned by forming an alignment control agent by polymerizing the monomer or oligomer included by the alignment layer while the alignment of liquid crystal is changed through application of the electric field (S7). The monomer or oligomer is polymerized by irradiating light (e.g., ultraviolet rays) that leads polymerization of the photo-polymerizable monomer or oligomer when the monomer or oligomer is a photo-polymerizable material. The alignment control agent is arranged following the alignment of the liquid crystal, and it maintains the same arrangement after the electric field is removed and influences alignment of neighboring liquid crystal. Therefore, the liquid crystal can be arranged to have a pretilt that is different from that of the first alignment by secondary alignment.

The pretilt can have an angle and a direction that will be defined as a polar angle (0 to 180 degrees) and an azimuthal angle (0 to 360 degrees). That is, the pretilt includes the azimuthal angle (0 to 360 degrees) and the polar angle (0 to 180 degrees). Here, the azimuthal angle represents the tilted angle of projection of the alignment layer or the liquid crystal onto the panel with reference to the gate line or the data line. The polar angle represents the tilted angle of the alignment control agent or the liquid crystal with reference to the vertical line (i.e., a normal line on the panel) to the horizontal surface of the panel.

The secondary alignment can be used for the case in which the liquid crystal has a pretilt so as to predetermine an operational direction of the liquid crystal when the electric field is applied. Particularly, the pretilt in the polar angle direction is important for the IPS mode, which will be mainly described.

An IPS mode liquid crystal display manufactured by applying a liquid crystal alignment method according to an exemplary embodiment of the present invention will now be described.

Figure 2:
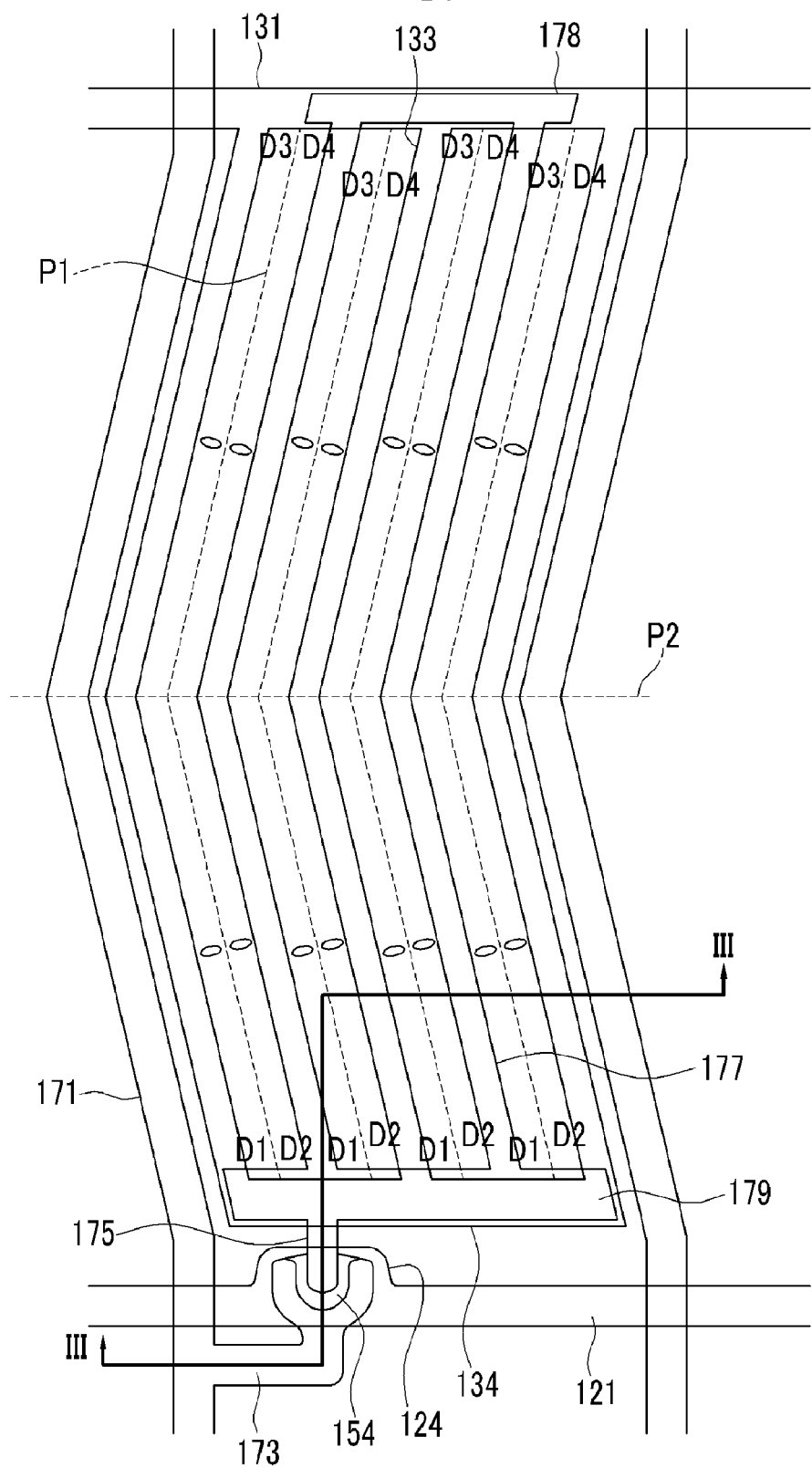
FIG. 2 shows a layout view of a liquid crystal display according to an exemplary embodiment of the present invention.
Figure 3:
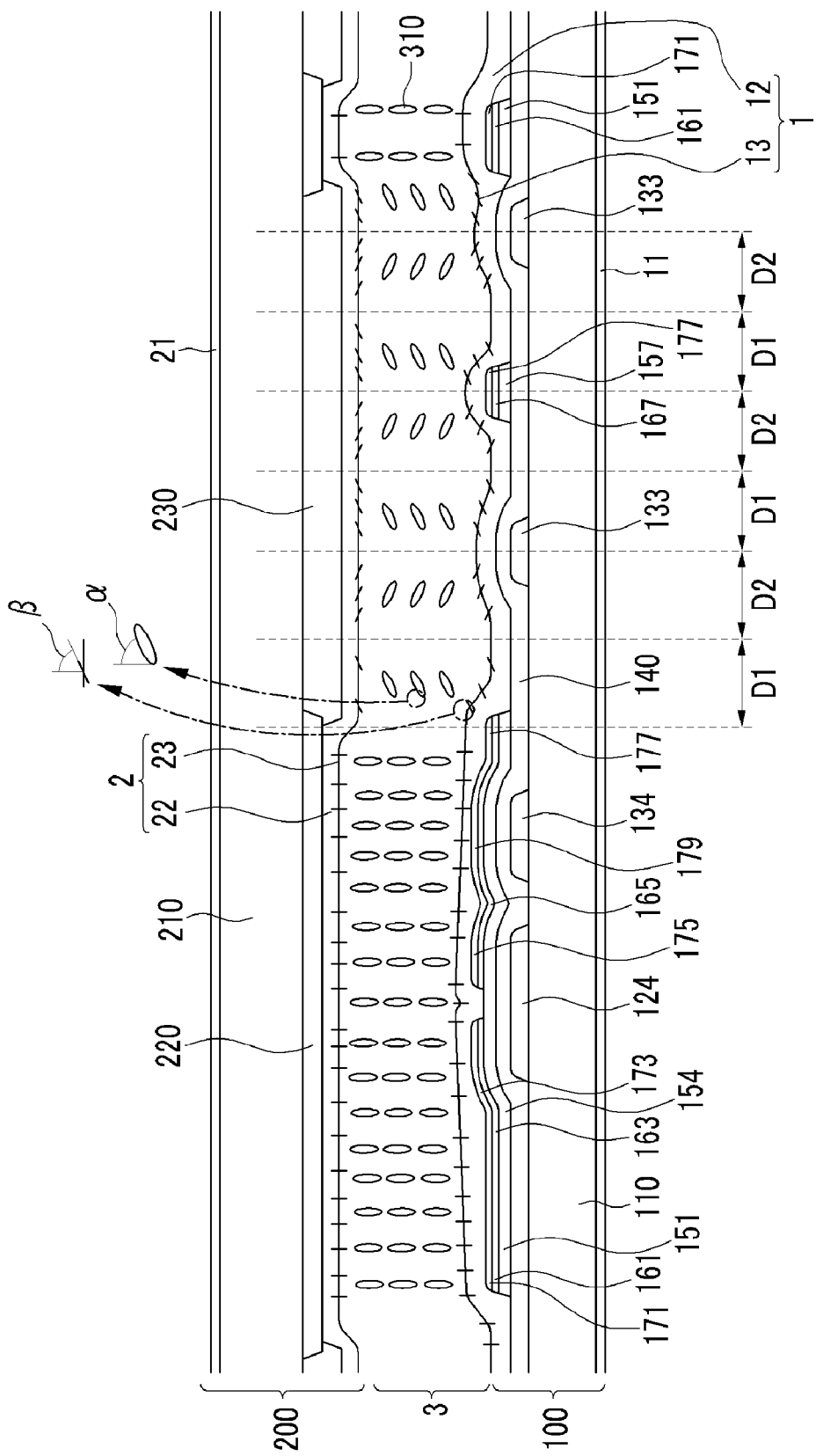
FIG. 3 shows a cross-sectional view of FIG. 2 with reference to line III-III.

FIG. 2 shows a layout view of a liquid crystal display according to an exemplary embodiment of the present invention, and FIG. 3 shows a cross-sectional view of FIG. 2 with reference to line III-III.

The liquid crystal display includes a thin film transistor panel 100, a facing panel 200, a liquid crystal layer 3, a lower polarizer 11, and an upper polarizer 21.

The thin film transistor panel 100 includes an insulation panel 110 and thin film layers formed thereon, and the common electrode panel 200 includes an insulation panel 210 and thin film layers formed thereon.

The thin film transistor panel 100 will now be described.

A gate line 121 including a gate electrode 124 and a common electrode line 131 are provided in the horizontal direction on the insulation panel 110 made of transparent glass. The common electrode line 131 is connected to linear common electrodes 133 and 134. A scanning signal is transmitted to a gate line 121, and a common voltage is transmitted to the common electrode line 131. The linear common electrodes 133 and 134 include a common electrode unit 133 connected to the common electrode line 131 and a common connector 134 for connecting another terminal of the common electrode unit 133. The center of the common electrode unit 133 is bent. The linear common electrodes 133 and 134 are made of transparent conductive layers such as indium tin oxide (ITO) or indium zinc oxide (IZO).

A gate insulating layer 140 is formed on the gate line 121 and the common electrode line 131, intrinsic semiconductors 151, 154, and 157 made of amorphous silicon are formed on the gate insulating layer 140, and ohmic contacts 161, 163, 165, and 167 made of material such as silicide or n+ hydrogenated amorphous silicon in which an n-type impurity is doped with a high concentration are formed on the intrinsic semiconductors 151, 154, and 157. The intrinsic semiconductors 151, 154, and 157 and the ohmic contacts 161, 163, 165, and 167 can all be called semiconductors for convenience of description, and the term semiconductor may signify a polysilicon semiconductor or an oxide semiconductor as well as the intrinsic semiconductor and the ohmic contact layer.

A data line 171 having a plurality of source electrodes 173, a drain electrode 175, and linear pixel electrodes 177, 178, and 179 connected to the drain electrode 175 are formed on the ohmic contacts 161, 163, 165, and 167. An image signal voltage is applied to the data line 171. The drain electrode 175 faces the source electrode 173 on the gate electrode 124. A channel of the intrinsic semiconductor 154 between the source electrode 173 and the drain electrode 175 is exposed. The linear pixel electrodes 177, 178, and 179 include a pixel electrode unit 177 provided in parallel with the common electrode unit 133, a first pixel connector 179 connected to the drain electrode 175 and connecting a first terminal of the pixel electrode unit 177, and a second pixel connector 178 for connecting another terminal of the pixel electrode unit 177. The center of the pixel electrode unit 177 is bent in a like manner of the common electrode unit 133. Also, the data line 171 is bent according to the shapes of the pixel electrode unit 177 and the common electrode unit 133. The linear pixel electrodes 177, 178, and 179 connected to the data line 171, the drain electrode 175, and the drain electrode 175 can be made of transparent conductive layers such as indium tin oxide (ITO) or indium zinc oxide (IZO).

The data line 171, the drain electrode 175, and the linear pixel electrodes 177, 178, and 179 can have substantially the same surface shape as the ohmic contacts 161, 163, 165, and 167, and the intrinsic semiconductors 151, 154, and 157 can have substantially the same surface shape as the ohmic contacts 161, 163, 165, and 167 except the source electrode 173 and the drain electrode 175. Differing from this, the ohmic contacts and the intrinsic semiconductors can be formed in an island form and be disposed around the gate electrode 124.

The gate electrode 124, source electrode 173, and drain electrode 175 form a thin film transistor (TFT) together with the intrinsic semiconductor 154, and a channel of the thin film transistor is formed on the channel of the intrinsic semiconductor 154 between the source electrode 173 and the drain electrode 175.

The common electrode unit 133 and the pixel electrode unit 177 function as a domain dividing means, they are formed as a plurality of bands at a predetermined angle off the gate line 121, and are alternately disposed. A region between the common electrode unit 133 and the pixel electrode unit 177 is divided into a first domain D1, a second domain D2, a third domain D3, and a fourth domain D4 with reference to a first boundary line P1 and a second boundary line P2. The first boundary line P1 is provided in the middle between the common electrode unit 133 and the pixel electrode unit 177, the common electrode unit 133 is in parallel with the pixel electrode unit 177, and the second boundary line P2 is provided in the middle between the neighboring gate line 121 and is in parallel with the gate line 121.

A lower alignment layer 1 is formed on the data line 171, the drain electrode 175, and the linear pixel electrodes 177, 178, and 179. The lower alignment layer 1 includes an alignment base layer 12 and an alignment control agent 13. The alignment base layer 12 is a liquid crystal vertical alignment layer of such as a polyamic acid, a polyimide, or lecithin, and the liquid crystal is basically aligned in the direction vertical to the panel by the alignment base layer 12. The alignment control agent 13 comes out of the alignment base layer 12 with a pretilt, particularly, a polar angle, and is formed by photo-polymerizing the photo-polymerizable monomer or oligomer.

The photo-polymerizable monomer or oligomer includes a reactive mesogen (RM) and NOA series by Norland. The reactive mesogen (RM) represents a polymerizable reactive mesogen compound. The mesogen compound or mesogen material includes a material or compounds including the mesogen radical of at least one of stick, plate, and disk shapes, that is, a radical that is capable of generating a liquid crystalline phase behavior. The liquid crystal compound having a radical in the shape of a stick or a plate is a calamitic liquid crystal that is well known to a skilled person, and the liquid crystal compound having a radical in the shape of a disk is a liquid crystal that is well known to a skilled person. The compound or material including the mesogen radical does not need to display a liquid crystalline phase. Also, it is possible to show the liquid crystalline phase behavior through mixture with another compound, or a mesogen compound or material, or when their mixture is polymerized.

The reactive mesogen is polymerized by the light such as the ultraviolet rays, and it represents a material that is aligned depending on the alignment state of the near material. An example of the reactive mesogen can be a compound that is expressed in the subsequent equation.

P1-A1-(Z1-A2)n-P2,

Here, P1 are P2 are independently selected from among acrylate, methacrylate, vinyl, vinyloxy, and epoxy groups, A1 and A2 are independently selected from 1,4-phenylene and naphthalene-2,6-diyl groups, Z1 is one of COO—, OCO—, and a single bond, and n is one of 0, 1, and 2.

In further detail, a compound expressed as one of the next equations can be exemplified.

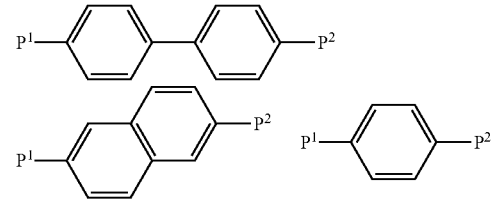

Here, P1 and P2 are independently selected from acrylate, methacrylate, vinyl, vinyloxy, and epoxy groups.

Since the alignment base layer 12 of the lower alignment layer 1 is formed with the material that has the vertical alignment characteristic, the liquid crystal is vertically aligned in the earlier stage, but since the alignment control agent 13 of the lower alignment layer 1 has a pretilt with a predetermined polar angle with reference to the direction vertical to the surface of the insulation panel 110, alignment of the liquid crystal is changed by the alignment force of the alignment control agent 13, and the liquid crystal is tilted with a predetermined polar angle with reference to the direction vertical to the surfaces of the insulation panels 110 and 210.

While not illustrated, an insulating layer for protecting the channel of the intrinsic semiconductor 154 can be further formed between the data line 171, drain electrode 175, linear pixel electrodes 177, 178, and 179, and lower alignment layer 1.

The facing panel 200 will now be described.

A light blocking member 220 is formed on an insulation panel 210 made of transparent glass, and a color filter 230 is formed in respective regions divided by the light blocking member 220.

The color filter 230 and the light blocking member 220 can be formed on the thin film transistor panel 100.

An upper alignment layer 2 is formed on the color filter 230. The upper alignment layer 2 includes an alignment base layer 22 and an alignment control agent 23. The alignment base layer 22 is a liquid crystal vertical alignment layer of such as a polyamic acid, a polyimide, or lecithin, and the liquid crystal is basically aligned in the direction vertical to the panel by the alignment base layer 22. The alignment control agent 23 comes out of the alignment base layer 22 with a pretilt, particularly, a polar angle, and is formed by photo-polymerizing the photo-polymerizable monomer or oligomer.

The photo-polymerizable monomer or oligomer includes the reactive mesogen (RM) and NOA series by Norland described above.

The liquid crystal is vertically aligned in the earlier stage because the alignment base layer 22 of the upper alignment layer 2 is formed with a material having the vertical alignment characteristic, but the alignment control agent 23 of the upper alignment layer 2 is tilted in a predetermined direction, alignment of the liquid crystal is changed by the alignment force of the alignment control agent 23, and a director of the liquid crystal is tilted with a predetermined polar angle off the surfaces of the panels 110 and 210.

The liquid crystal layer 3 includes liquid crystal with positive dielectric anisotropy, the alignment control agents 13 and 23 are tilted with a predetermined polar angle off the surfaces of the panels 110 and 210, and liquid crystal adjacent to the lower alignment layer 1 and the upper alignment layer 2 is tilted with a predetermined polar angle with reference to the surfaces of the panels 110 and 210 because of the influence of the alignment control agents 13 and 23 of the lower alignment layer 1 and the upper alignment layer 2.

Accordingly, when the liquid crystal that is near the lower alignment layer 1 and the upper alignment layer 2 has a pretilt with a predetermined polar angle, the response speed is fast because the liquid crystal in all the regions is immediately tilted according to the pretilt when the electric field is applied. Particularly, liquid crystal that is near a facing panel having no linear common electrode and linear pixel electrode immediately becomes tilted according to the pretilt, and hence, the response speed is very fast. Therefore, the problem of afterimage in the video is solved.

Further, since the linear common electrodes 133 and 134 and the linear pixel electrodes 177, 178, and 179 are configured by a transparent conductive layer such as ITO or IZO and the liquid crystal on the linear common electrodes 133 and 134 and the linear pixel electrodes 177, 178, and 179 has a pretilt and is immediately tilted in the direction parallel to that of the electric field when a driving voltage is applied, liquid crystal that is helpful for image displaying is increased. Therefore, the aperture ratio is improved and the luminance is increased.

Also, since the liquid crystal has positive dielectric anisotropy, when the electric field is applied, the liquid crystal is arranged in the same direction as the electric field that is formed in the direction that is vertical to the sides of the common electrode 133 and the pixel electrode 177. Hence, multiple alignments can be realized by arranging the liquid crystal in the different directions for respective first to fourth domains. That is, the liquid crystal is arranged with different pretilts for the first to fourth domains to thus realize multiple alignments. In this instance, since the liquid crystal has a pretilt with a predetermined polar angle, liquid crystal in all regions is tilted according to the pretilt when the electric field is applied, the alignment directions of the liquid crystal that is provided around the boundary line between domains are different for the respective domains, and hence, the multiple alignments are perfectly realized to improve the viewing angle.

The lower alignment layer 1 and the upper alignment layer 2 have been described to have the alignment base layers 12 and 22 and the alignment polymers 13 and 23 in the above-described exemplary embodiment, and it is also possible for one of the lower alignment layer 1 and the upper alignment layer 2 to have the alignment base layer and the alignment polymer and for the other to have the alignment base layer.

Also, when the photo-polymerizable monomer or oligomer is added and interposed to the liquid crystal, the liquid crystal layer 3 may have an alignment control agent separated from the lower alignment layer 1 and the upper alignment layer 2, and the photo-polymerizable monomer or oligomer that is not photo-polymerized may remain.

The lower polarizer 11 and the upper polarizer 21 can be disposed to have crossed transmissive axes.

A method for manufacturing a liquid crystal display according to an exemplary embodiment of the present invention will now be described with reference to FIG. 4 and FIG. 5.

Figure 4:
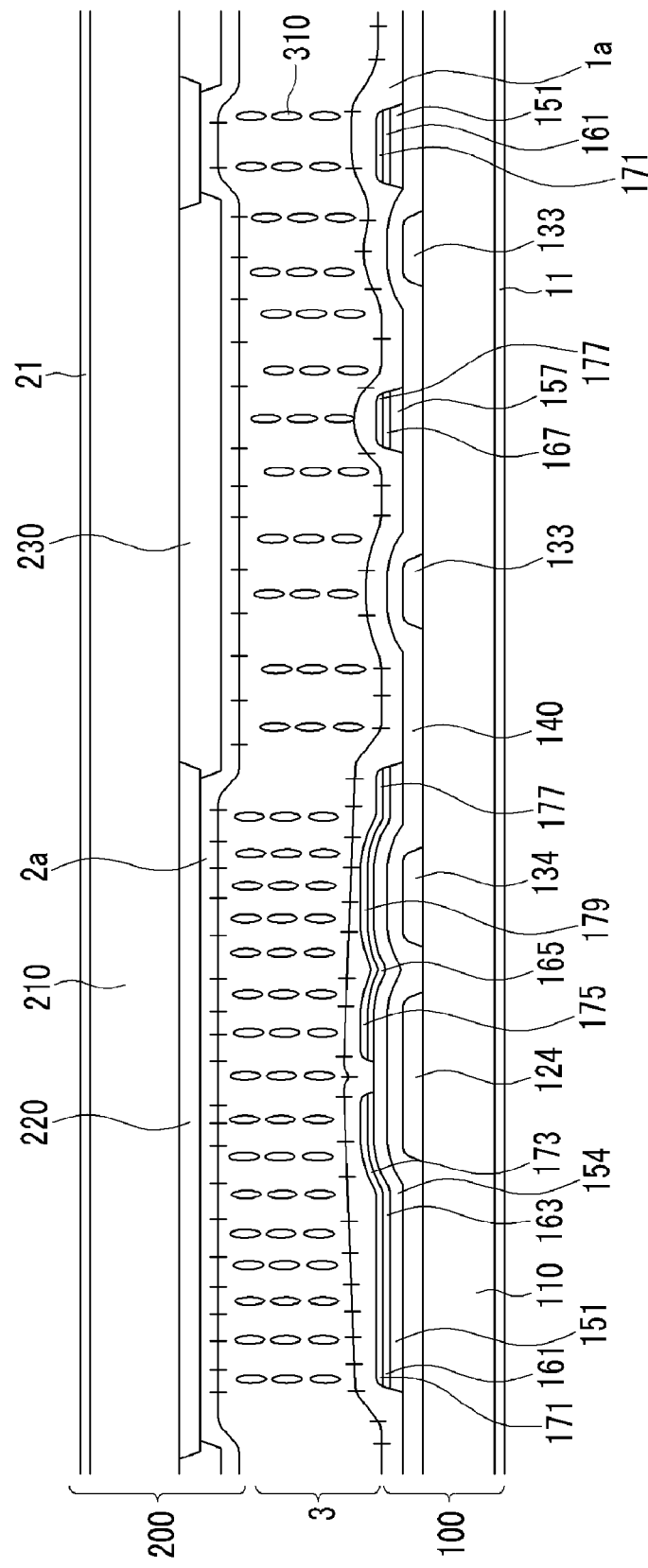
FIG. 4 shows a cross-sectional view for firstly aligning liquid crystal according to an exemplary embodiment of the present invention.
Figure 5:
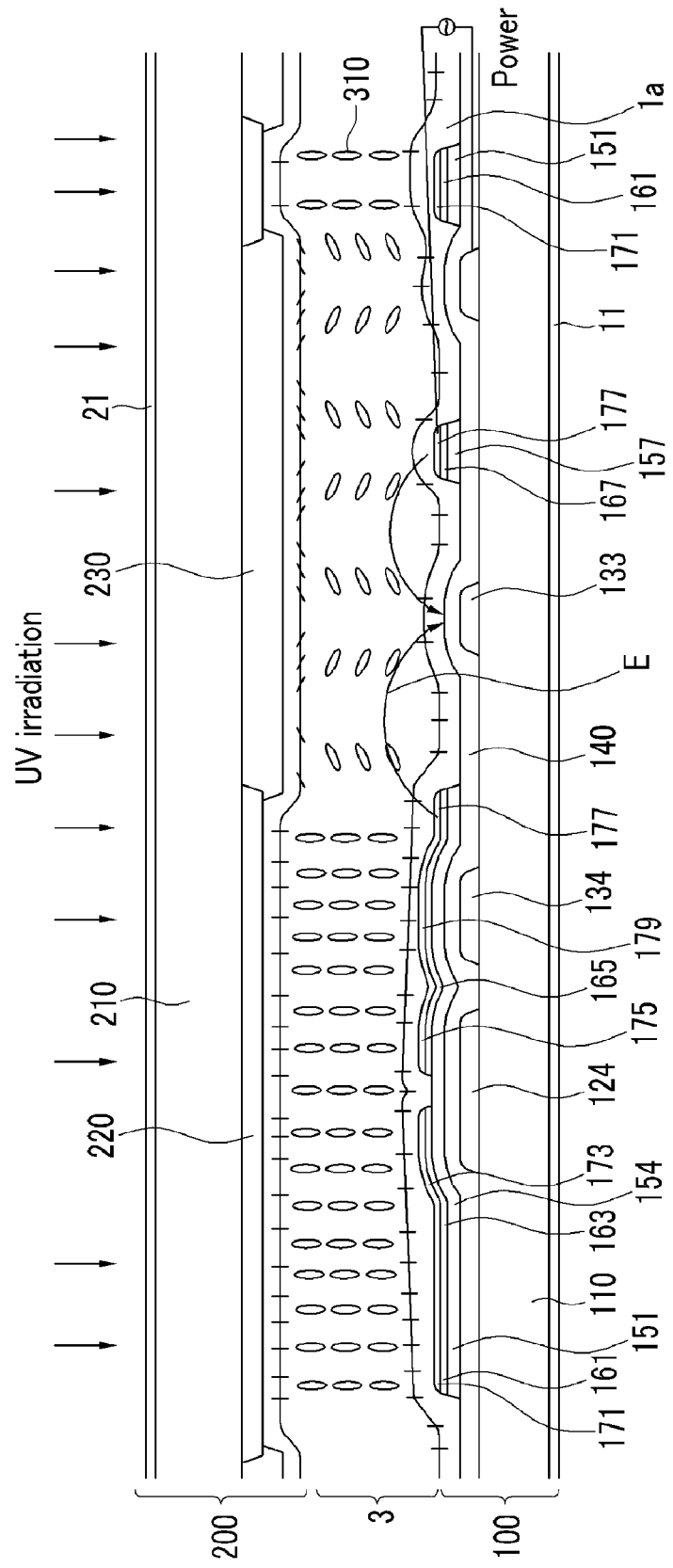
FIG. 5 shows a cross-sectional view of for secondarily aligning liquid crystal according to an exemplary embodiment of the present invention.

FIG. 4 shows a cross-sectional view for firstly aligning liquid crystal according to an exemplary embodiment of the present invention, and FIG. 5 shows a cross-sectional view for secondarily aligning liquid crystal according to an exemplary embodiment of the present invention.

As shown in FIG. 4, a thin film layer including wiring, a thin film transistor, linear common electrodes 133 and 134, and linear pixel electrodes 177, 178, and 179 is formed on an insulation panel 110 by using thin film deposition, photolithography, and photo-etching. Also, a thin film layer including a light blocking member 220 and a color filter 230 is formed on an insulation panel 210 by using thin film deposition, photolithography, and photo-etching.

Next, a ground material and a photo-polymerizable monomer or oligomer are mixed and coated on the thin film layer of the thin film transistor panel 100, and the alignment ground material is hardened by curing the same at a temperature (100 to 180 degrees Celsius) for 0.5 to 1 hour, thereby forming a lower alignment layer 1a including the photo-polymerizable monomer or oligomer. Also, the alignment ground material and the photo-polymerizable monomer or oligomer are mixed and coated on the thin film layer of the facing panel 200, and the alignment ground material is hardened by curing the same at a temperature (100 to 180 degrees Celsius) for 0.5 to 1 hour, thereby forming an upper alignment layer 2a including the photo-polymerizable monomer or oligomer.

Here, the alignment ground material is a liquid crystal vertical alignment layer of such as a polyamic acid, a polyimide, or lecithin, and the liquid crystal is firstly aligned in the direction vertical to the panel by the alignment ground material. Therefore, the lower alignment layer 1a and the upper alignment layer 2a including the photo-polymerizable monomer or oligomer can firstly align the liquid crystal in the direction vertical to the panels 100 and 200 by the alignment ground material. The photo-polymerizable monomer or oligomer includes the reactive mesogen (RM) and NOA series by Norland as described.

Then, the thin film transistor panel 100 and the facing panel 200 are combined. The panels 100 and 200 can be combined by two methods.

The first method is to coat a sealant on one of the thin film transistor panel 100 and the facing panel 200 to define a region in which the liquid crystal is filled, drip the liquid crystal into the defined region, and arrange and combine the thin film transistor panel 100 and the facing panel 200. In this instance, a spacer for maintaining a gap between the two panels 100 and 200 can be sprayed before or after the liquid crystal is dripped. The spacer can be formed on the thin film transistor panel 100 and the facing panel 200 through a thin film formation process in advance. In this instance, the liquid crystal can be dripped after adding the photo-polymerizable monomer or oligomer thereto.

In another way, a sealant is coated on one of the thin film transistor panel 100 and the facing panel 200 to define a region in which liquid crystal will be filled, a liquid crystal interposition hole is formed, and then the two panels 100 and 200 are arranged and combined. The liquid crystal can be interposed by dipping the liquid crystal interposition hole in a liquid crystal storage tank in a vacuum state and eliminating the vacuum, and then the liquid crystal interposition hole can be sealed. Further, the liquid crystal can be interposed by adding the photo-polymerizable monomer or oligomer to the liquid crystal.

Next, as shown in FIG. 5, a horizontal electric field (E) is formed between the common electrode unit 133 and the pixel electrode unit 177 by applying a voltage between the linear pixel electrodes 177, 178, and 179 and the linear common electrodes 133 and 134. The electric field is applied to the liquid crystal by applying the voltage between two electrodes that are formed on the panel or by applying the voltage between electrodes that are installed outside. Since the liquid crystal has positive dielectric anisotropy, the liquid crystal is tilted in the direction in parallel with the electric field. Since the electric field is formed in the direction in parallel to the panel surface, the liquid crystal that was firstly aligned in the direction vertical to the panel surface is secondarily aligned in the direction in parallel to the horizontal electric field (E) to have a predetermined polar angle.

Light such as the ultraviolet rays is irradiated to the lower and upper alignment layers 1 and 2 to photo-polymerize the photo-polymerizable monomer or oligomer, thereby forming alignment control agents 13 and 23 coming out of the alignment base layers 12 and 22. The alignment control agents 13 and 23 have a pretilt with a predetermined polar angle according to the secondary alignment state of the liquid crystal.

Here, the pretilts of the alignment control agents 13 and 23 can be controlled by varying the voltage between the linear pixel electrodes 177, 178, and 179 and the linear common electrodes 133 and 134. That is, when a strong voltage is applied between the linear pixel electrodes 177, 178, and 179 and the linear common electrodes 133 and 134, the liquid crystal is arranged in the direction in parallel to the horizontal electric field (E), and when the ultraviolet rays are irradiated in this state, the alignment control agents 13 and 23 have a big pretilt. On the contrary, when a weak voltage is applied between the linear pixel electrodes 177, 178, and 179 and the linear common electrodes 133 and 134, the liquid crystal is arranged with a small polar angle with reference to the direction vertical to the surfaces of the panels 110 and 210, and when the ultraviolet rays are irradiated, the alignment control agents 13 and 23 have a small pretilt.

Accordingly, when the photo-polymerizable monomer or oligomer and the alignment ground material are mixed to form an alignment layer and an alignment control agent is formed by photo-polymerizing the alignment layer, it is easy to control the pretilt of the alignment control agent, and the problem that may occur when the photo-polymerizable monomer or oligomer remains at the liquid crystal layer 3 can be prevented.

The method for filling the liquid crystal between the thin film transistor panel 100 and the facing panel 200, applying the voltage, irradiating the ultraviolet rays, and forming the alignment control agents 13 and 23 has been described, and differing from this, it is also possible to apply a voltage between the linear pixel electrodes 177, 178, and 179 and the linear common electrodes 133 and 134 before filling the liquid crystal between the thin film transistor panel 100 and the facing panel 200, irradiating the ultraviolet rays to the alignment layers 1 and 2 including the photo-polymerizable monomer or oligomer, and forming the alignment control agents 13 and 23. The liquid crystal is interposed after the alignment control agents 13 and 23 are formed.

A module operation is then progressed.

It is possible to differentiate the polar angles of the liquid crystal in different regions, increasing compensation rates of optical characteristics between the different regions, and thereby improve lateral visibility, which will be described in another exemplary embodiment.

Figure 6:
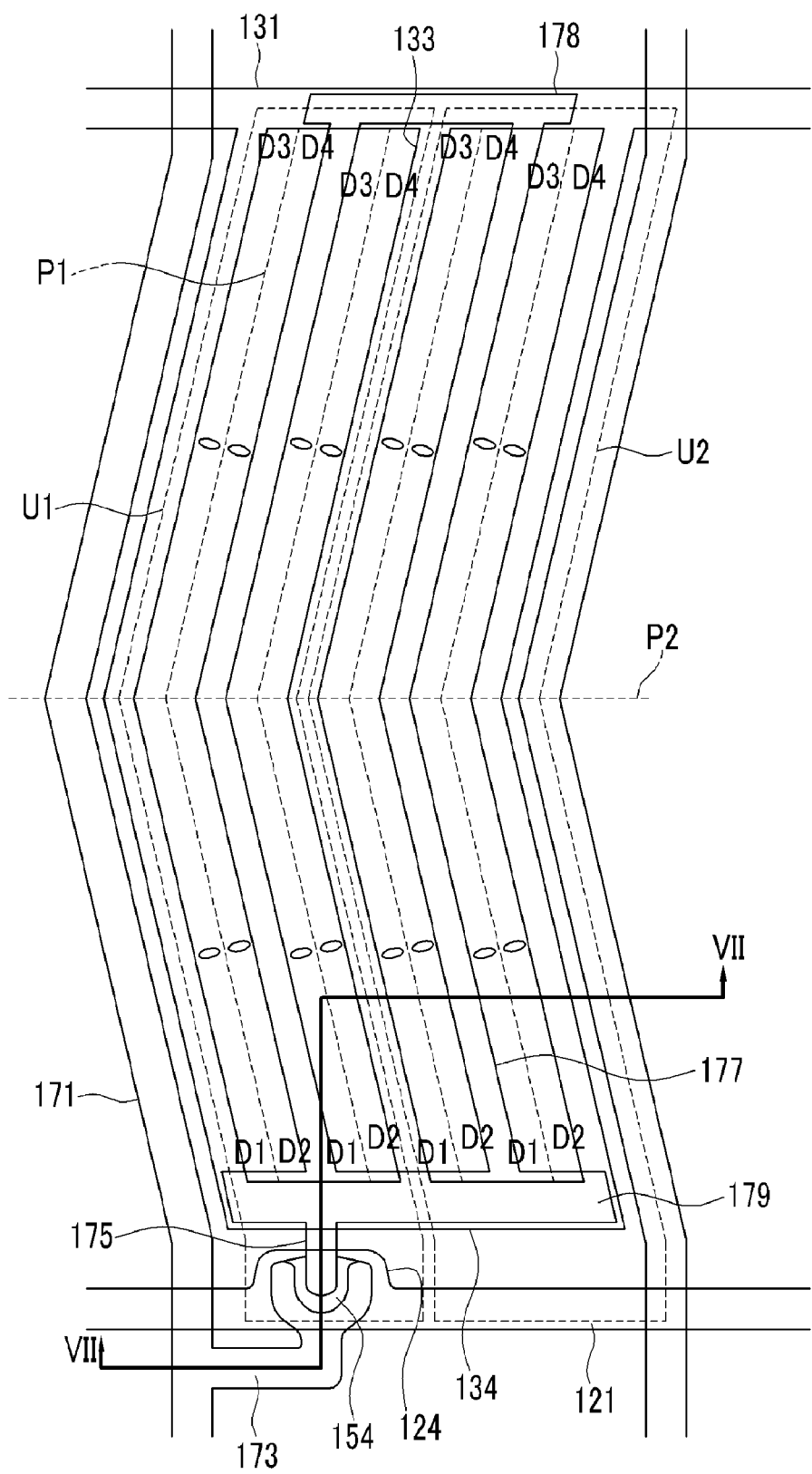
FIG. 6 shows a layout view of a liquid crystal display according to another exemplary embodiment of the present invention.
Figure 7:
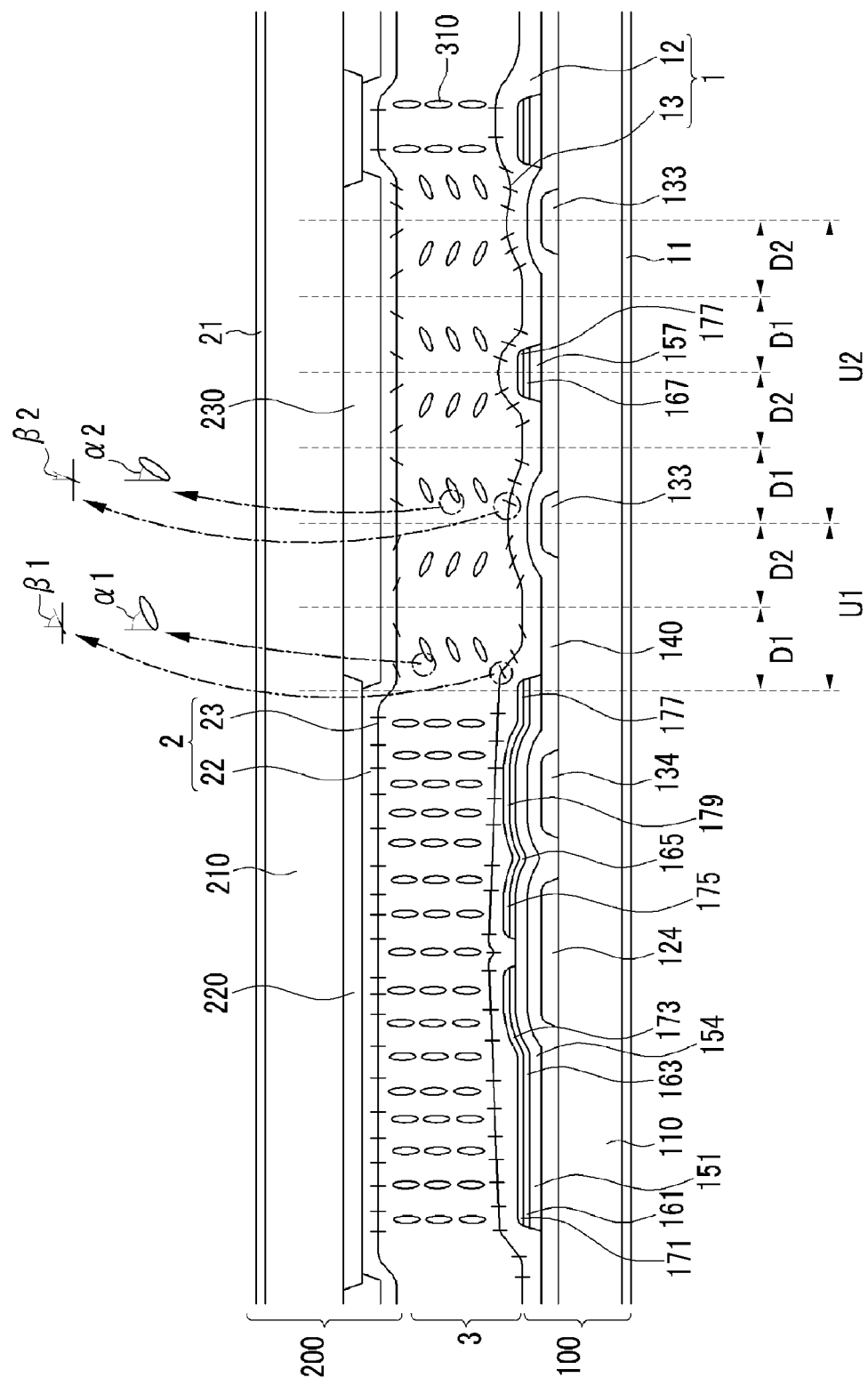
FIG. 7 shows a cross-sectional view of FIG. 6 with reference to line VII-VII.

FIG. 6 shows a layout view of a liquid crystal display according to another exemplary embodiment of the present invention, and FIG. 7 shows a cross-sectional view of FIG. 6 with reference to line VII-VII.

The present exemplary embodiment substantially corresponds to the exemplary embodiment shown in FIG. 2 and FIG. 3, except for the structure in which the pretilts of the polar angles of the alignment control agents of the first region U1 and the second region are differentiated to differentiate the polar angles of the liquid crystal in the first region U1 and the second region.

As shown in FIG. 6 and FIG. 7, in the liquid crystal display according to another exemplary embodiment of the present invention, a region between the common electrode unit 133 and the pixel electrode unit 177 is divided into a first domain D1, a second domain D2, a third domain D3, and a fourth domain D4 with reference to a first boundary line P1 and a second boundary line P2. The first boundary line P1 is provided in the middle between the common electrode unit 133 and the pixel electrode unit 177 and is in parallel with the common electrode unit 133 and the pixel electrode unit 177, and the second boundary line P2 is provided in the middle between the adjacent gate line 121 and is in parallel with the gate line 121.

When the thin film transistor panel 100 and the facing panel 200 are arranged, the linear common electrodes 133 and 134 and the linear pixel electrodes 177, 178, and 179 divide the liquid crystal layer 300 into a plurality of subregions. The subregions are classified into 8 groups according to the director of the liquid crystal when the electric field is applied, and are called domains.

Accordingly, when the thin film transistor panel 100 and the facing panel 200 are arranged, the linear common electrodes 133 and 134 and the linear pixel electrodes 177, 178, and 179 divide a pixel area into a plurality of domains, and control the electric field that is formed when the voltage is applied between the linear common electrodes 133 and 134 and the linear pixel electrodes 177, 178, and 179 to have a horizontal component for the panels 110 and 210 and control the direction in which the liquid crystal is tilted.

The domains are classified into 4 types according to the director of the liquid crystal, and each domain is formed to have a longish shape having width and length. Since the arrangement of the liquid crystal has regularity in the domain, the viewing angle of the liquid crystal display is extended. FIG. 6 illustrates 4 first domains D1, 4 second domains D2, 4 third domains D3, and 4 fourth domains D4, the first region U1 includes one of the first domain to the fourth domain, and the second region U2 includes another one of the first domain to the fourth domain.

The lower alignment layer 1 includes an alignment base layer 12 and an alignment control agent 13. The alignment base layer 12 is a liquid crystal vertical alignment layer such as a polyamic acid, a polyimide, or lecithin, and the liquid crystal is basically aligned in the direction vertical to the panel by the alignment base layer 12. The alignment control agent 13 comes out of the alignment base layer 12 with a pretilt, particularly, a polar angle, and it is formed by photo-polymerizing the photo-polymerizable monomer or oligomer. In this instance, the polar angle β 1 of the alignment control agent 13 provided in the first region U1 is different from the polar angle β 2 of the alignment control agent 13 provided in the second region U2.

The upper alignment layer 2 includes an alignment base layer 22 and an alignment control agent 23. The alignment base layer 22 is a liquid crystal vertical alignment layer such as a polyamic acid, a polyimide, or lecithin, and the liquid crystal is basically aligned in the direction vertical to the panel by the alignment base layer 12. The alignment control agent 23 comes out of the alignment base layer 22 with a pretilt, particularly, a polar angle, and it is formed by photo-polymerizing the photo-polymerizable monomer or oligomer. In this instance, the polar angle β 1 of the alignment control agent 13 provided in the first region U1 is different from the polar angle β 2 of the alignment control agent 13 provided in the second region U2.

The liquid crystal layer 3 includes liquid crystal with positive dielectric anisotropy, the alignment control agents 13 and 23 are tilted with a predetermined polar angle off the surfaces of the panels 110 and 210, and liquid crystal adjacent to the lower alignment layer 1 and the upper alignment layer 2 is tilted with a predetermined polar angle with reference to the surfaces of the panels 110 and 210 because of the influence by the alignment control agents 13 and 23 of the lower alignment layer 1 and the upper alignment layer 2.

Accordingly, when the liquid crystal that is near the lower alignment layer 1 and the upper alignment layer 2 has a pretilt with a predetermined polar angle, the response speed is fast because the liquid crystal in all the regions is immediately tilted according to the pretilt when the electric field is applied. Particularly, liquid crystal that is near a facing panel having no linear common electrode and linear pixel electrode immediately becomes tilted according to the pretilt, and hence, the response speed is very fast. Therefore, the problem of after-image in the video is solved.

Since the alignment control agents 13 and 23 influence alignment of the adjacent liquid crystal, and the polar angle β 1 of the alignment control agents 13 and 23 provided in the first domain D1 and the second domain D2 of the first region U1 is greater than the pretilt angle β 2 of the alignment polymers 13 and 23 provided in the first domain D1 and the second domain D2 of the second region U2, the polar angle α 2 of the liquid crystal that is near the lower and upper alignment layers 1 and 2 provided in the first domain D1 and the second domain D2 of the first region U1 is greater than the polar angle α 2 of the liquid crystal that is near the lower and upper alignment layers 1 and 2 provided in the first domain D1 and the second domain D2 of the second region U2.

Therefore, the entire liquid crystal of the liquid crystal layer 3 is immediately tilted in the pretilt direction when the voltage is applied according to the polar angle of the liquid crystal that is near the lower and upper alignment layers 1 and 2, and in this instance, the polar angle of the liquid crystal provided in the first domain D1 and the second domain D2 of the first region U1 is greater than the polar angle of the liquid crystal that is provided in the first domain D1 and the second domain D2 of the second region U2. Therefore, since gamma curves of the first region U1 and the second region U2 are different, lateral visibility is improved when the optical characteristics of the first region U1 and the second region U2 are efficiently compensated.

The exemplary embodiment in which the lower alignment layer 1 and the upper alignment layer 2 have the alignment base layers 12 and 22 and the alignment polymers 13 and 23 has been described, and it is possible for one of the lower alignment layer 1 and the upper alignment layer 2 to have the alignment base layer and the alignment polymer and for the other one to have the alignment base layer.

Figure 8:
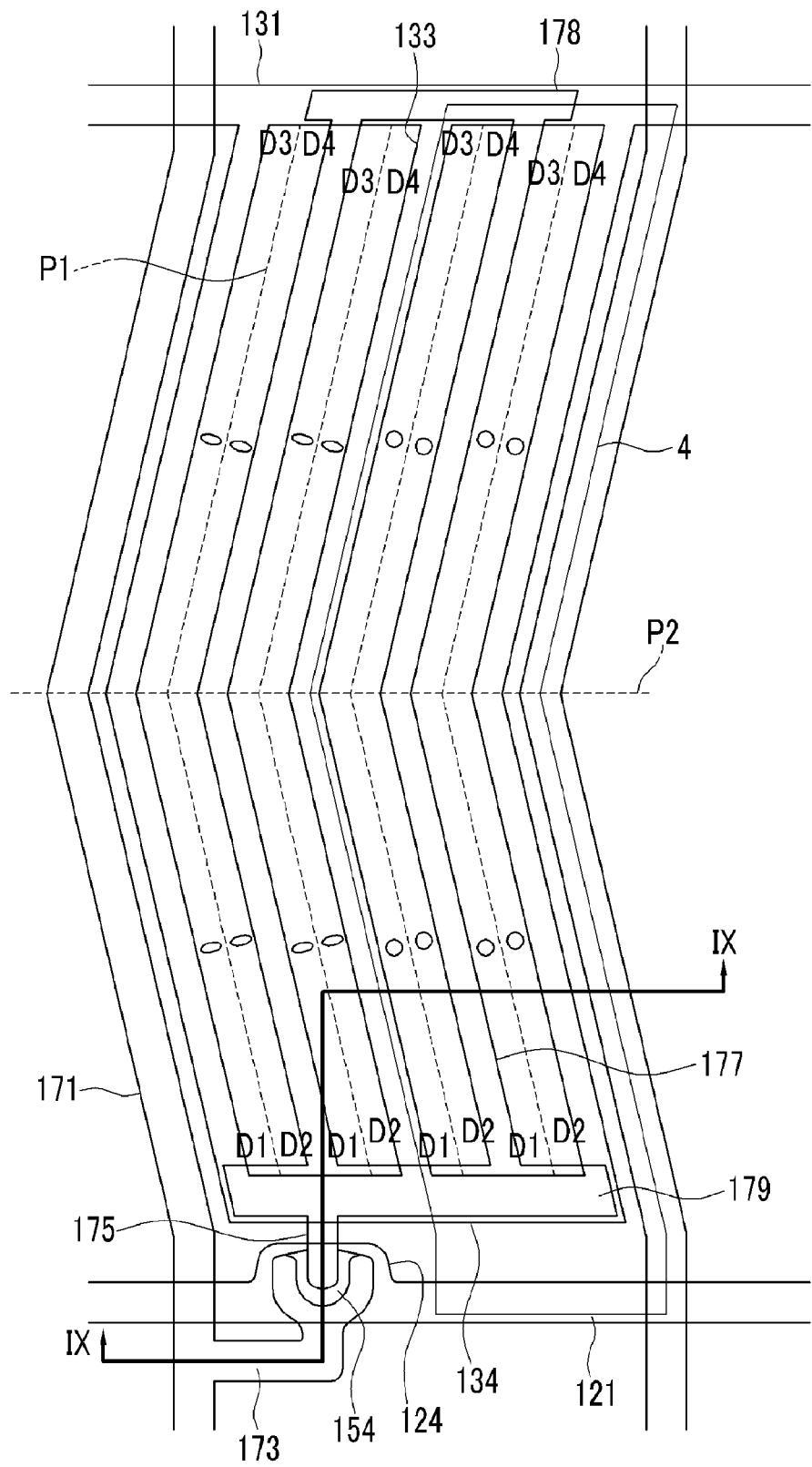
FIG. 8 and FIG. 9 show a liquid crystal display manufacturing method according to another exemplary embodiment of the present invention.
Figure 9:
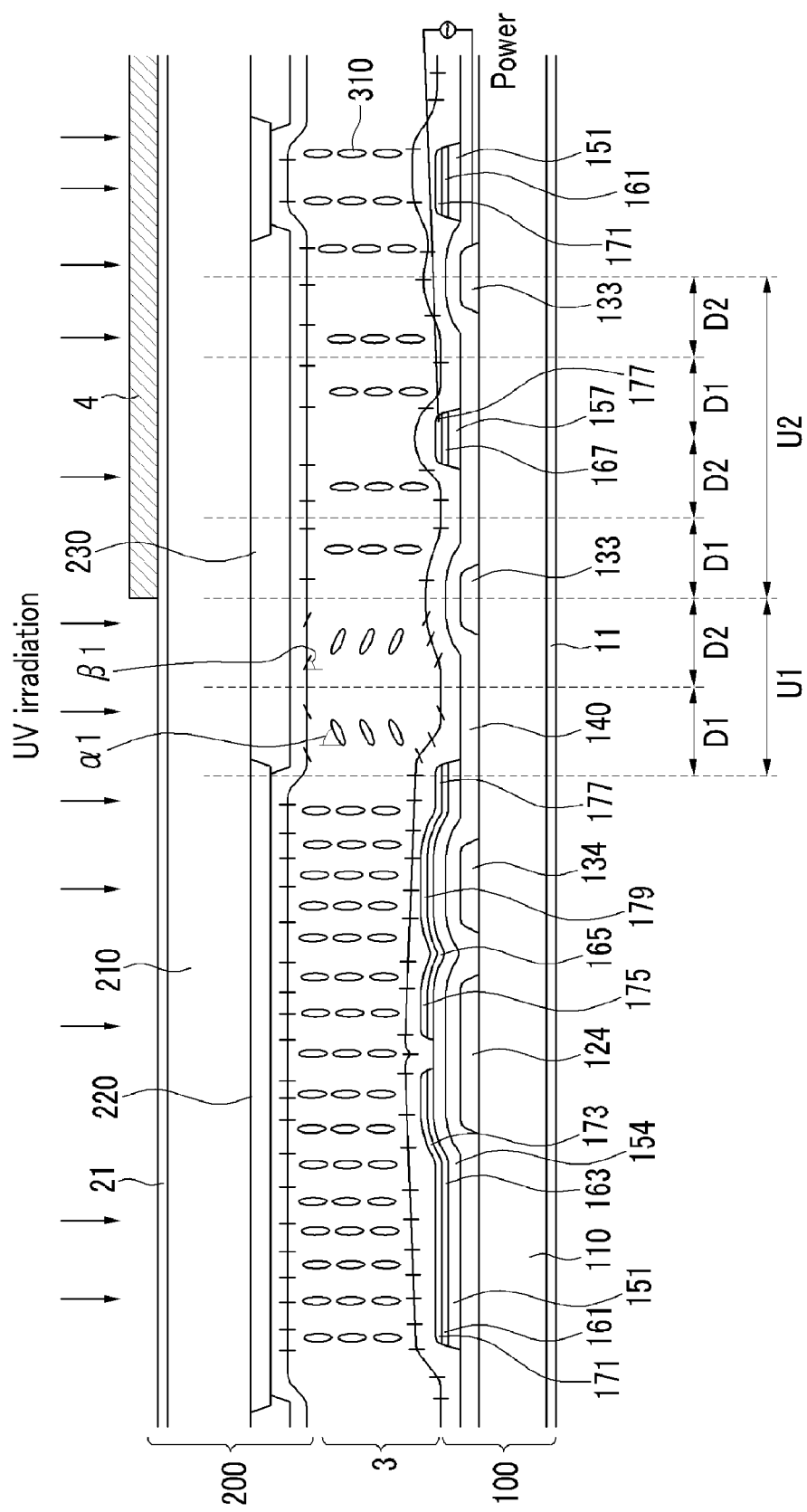

FIG. 8 and FIG. 9 show a liquid crystal display manufacturing method according to another exemplary embodiment of the present invention.

As shown in FIG. 4, a thin film layer including wiring, a thin film transistor, linear common electrodes 133 and 134, and linear pixel electrodes 177, 178, and 179 is formed on an insulation panel 110 by using thin film deposition, photolithography, and photo-etching. Also, a thin film layer including a light blocking member 220 and a color filter 230 is formed on an insulation panel 210 by using thin film deposition, photolithography, and photo-etching.

Next, an alignment ground material and a photo-polymerizable monomer or oligomer are mixed and coated on the thin film layer of the thin film transistor panel 100, and the alignment ground material is hardened by curing the same at a temperature (100 to 180 degrees Celsius) for 0.5 to 1 hour, thereby forming a lower alignment layer 1a including the photo-polymerizable monomer or oligomer. Also, the alignment ground material and the photo-polymerizable monomer or oligomer are mixed and coated on the thin film layer of the facing panel 200, and the alignment ground material is hardened by curing the same at a temperature (100 to 180 degrees Celsius) for 0.5 to 1 hour, thereby forming an upper alignment layer 2a including the photo-polymerizable monomer or oligomer.

Here, the alignment ground material is a liquid crystal vertical alignment layer of such as a polyamic acid, a polyimide, or lecithin, and the liquid crystal is firstly aligned in the direction vertical to the panel by the alignment ground material. Therefore, the lower alignment layer 1a and the upper alignment layer 2a including the photo-polymerizable monomer or oligomer can firstly align the liquid crystal in the direction vertical to the panels 100 and 200 by the alignment ground material. The photo-polymerizable monomer or oligomer includes the reactive mesogen (RM) and NOA series by Norland as described.

Then, the thin film transistor panel 100 and the facing panel 200 are combined.

The liquid crystal is rearranged by applying the first electric field between the common electrode unit 133 and the pixel electrode unit 177 as shown in FIG. 8 and FIG. 9. In this instance, the inclination angle α 1 of liquid crystal is increased by increasing intensity of the first electric field. An optical mask 4 with the same shape of the second region U2 in the pixel area is provided in the second region U2 and the light such as the ultraviolet rays is irradiated thereon. Therefore, the light is irradiated to the first region U1 that is not covered by the optical mask 4. In this instance, since the monomer or oligomer included in the lower and upper alignment layers 1 and 2 is a photo-polymerizable material, the monomer or oligomer is photo-polymerized by the light such as the ultraviolet rays and the alignment control agents 13 and 23 come out of the alignment base layers 12 and 22. The alignment control agents 13 and 23 are formed in the first region U1. The alignment control agents 13 and 23 formed in the first region U1 have a polar angle according to the arrangement of the liquid crystal. Therefore, since the liquid crystal has a big polar angle by the first electric field of great intensity, the alignment control agents 13 and 23 provided in the first region U1 have a big polar angle β 1.

As shown in FIG. 7, liquid crystal is rearranged by applying the second electric field between the common electrode unit 133 and the pixel electrode unit 177. The intensity of the second electric field becomes less than that of the first electric field, and the polar angle α 2 of the liquid crystal becomes less than the first electric field. Light is irradiated to the first region U1 and the second region U2 by irradiating light such as the ultraviolet rays without an additional optical mask. In this instance, the monomer or oligomer included in the lower and upper alignment layers 1 and 2 is photo-polymerized, and the alignment control agents 13 and 23 come out of the alignment base layers 12 and 22. The alignment control agents 13 and 23 are formed in the second region U2, and an alignment control agent having a fixed pretilt is formed in the first region U1. The alignment control agents 13 and 23 that are formed in the second region U2 have a pretilt with a polar angle according to the arrangement state of the liquid crystal. Therefore, since the liquid crystal has a small inclination angle α 2 by the second electric field of small intensity, the polar angle β 2 of the alignment control agents 13 and 23 provided in the second region U2 becomes less than the pretilt angle β 1 of the alignment control agents 13 and 23 provided in the first region U1.

In this instance, the liquid crystal that is near the lower alignment layer 1 and the upper alignment layer 2 has a polar angle by influence of the alignment control agents 13 and 23 of the lower alignment layer 1 and the upper alignment layer 2, and the polar angle α 2 of the liquid crystal that is near the lower and upper alignment layers 1 and 2 provided in the second region U2 becomes less than the polar angle α 1 of the liquid crystal that is near the lower and upper alignment layers 1 and 2 provided in the first region U1.

Therefore, the entire liquid crystal of the liquid crystal layer is immediately tilted in the pretilt direction when the voltage is applied according to the pretilt of the liquid crystal that is near the lower and upper alignment layers 1 and 2, and in this instance, the polar angle α 1 of the liquid crystal provided in the first region U1 is greater than the polar angle α 2 of the entire liquid crystal that is provided in the second region U2. Therefore, since gamma curves of the first region U1 and the second region U2 are different, lateral visibility is improved when the optical characteristics between the different regions are efficiently compensated.

The module process is progressed with polarizers 11 and 21 attached thereto.

The optical mask is used to differentiate the polar angle of the alignment control agent for each different region, the polar angle of the liquid crystal provided in the different region is differentiated to increase the compensation rates of the optical characteristics between the different regions, and the lateral visibility is accordingly improved, and it is also possible to differentiate the polar angle of the liquid crystal provided in the different regions by differentiating the polar angle of the alignment control agent for each different region in the optical alignment layer and improve lateral visibility by increasing the compensation rate of the optical characteristics between different regions.

Figure 10:
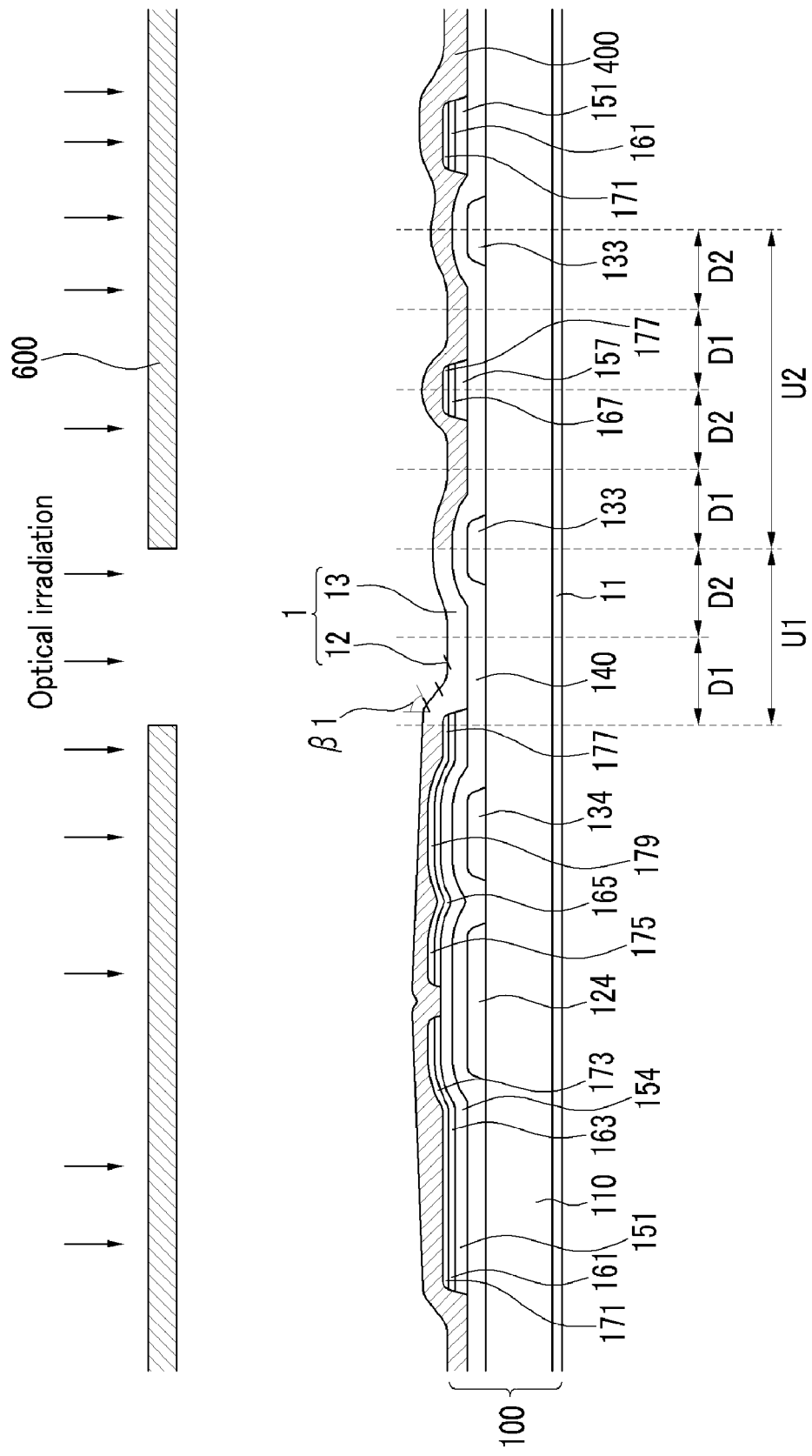
FIG. 10 and FIG. 11 show a method for differentiating polar angles of alignment control agents of a first region U1 and a second region U2 in an optical alignment layer.
Figure 11:
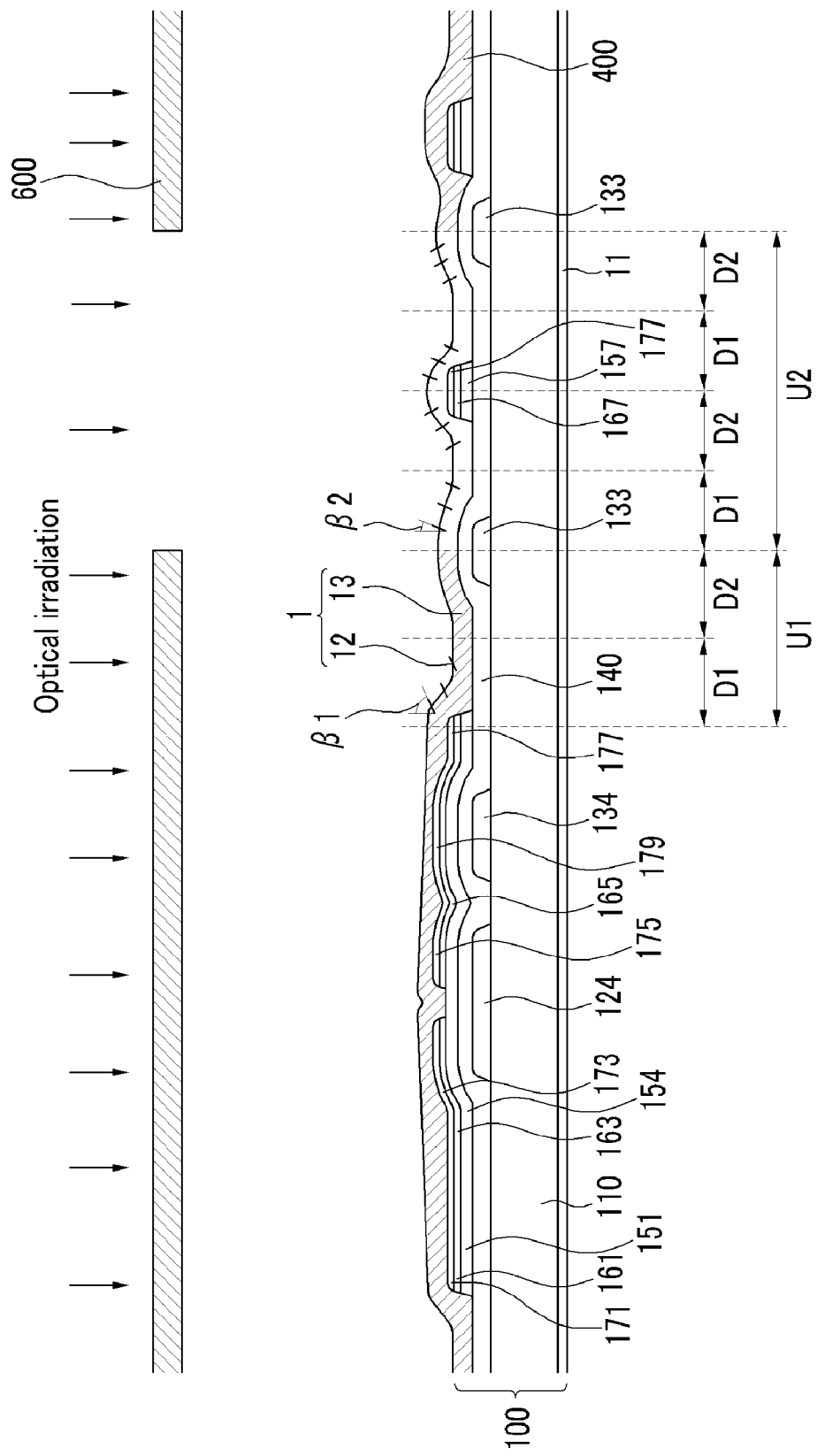

FIG. 10 and FIG. 11 show a method for differentiating polar angles of alignment control agents of a first region U1 and a second region U2 in an optical alignment layer.

As shown in FIG. 10, a thin film layer including wiring, a thin film transistor, linear common electrodes 133 and 134, and linear pixel electrodes 177, 178, and 179 is formed on an insulation panel 110 by using thin film deposition, photolithography, and photo-etching. The alignment ground material and the photo-polymerizable monomer or oligomer are mixed and coated on the thin film layer of the thin film transistor panel 100 to form an alignment material 400. The UV rays are irradiated to the first region U1 and the alignment ground material is optically aligned to form the alignment base layer 13, and the photo-polymerizable monomer or oligomer is polymerized to form the alignment control agent 12. Here, when the UV rays are irradiated to the first region U1, the second region U2 is blocked from the UV by using an optical mask 600. In this instance, the polar angle β 1 of the alignment control agent 13 provided in the first region U1 controls the UV rays to be substantially increased.

As shown in FIG. 11, the UV rays are irradiated to the second region U2 to optically align the alignment ground material and then optically align the alignment base layer 13, and the photo-polymerizable monomer or oligomer is polymerized to form the alignment control agent 12 and complete the lower alignment layer 1. Here, when the UV rays are irradiated to the second region U2, the first region U2 blocks the UV rays by using the optical mask 600. In this instance, the polar angle β 2 of the alignment control agent 13 provided in the second region U2 is formed to be less than the polar angle β 1 of the alignment control agent 13 provided in the first region U1 by controlling the UV rays.

The facing panel 200 forms the upper alignment layer 2 in a like manner of the thin film transistor panel 100, and the thin film transistor panel 100 and the facing panel 200 are combined.

In this instance, the liquid crystal that is near the lower alignment layer 1 and the upper alignment layer 2 has a polar angle by the influence of the alignment control agents 13 and 23 of the lower alignment layer 1 and the upper alignment layer 2, and the polar angle α 2 of the liquid crystal that is near the lower and upper alignment layers 1 and 2 provided in the second region U2 becomes less than the polar angle α 1 of the liquid crystal that is near the lower and upper alignment layers 1 and 2 provided in the first region U1.

Therefore, the entire liquid crystal of the liquid crystal layer is immediately tilted in the pretilt direction when the voltage is applied according to the pretilt of the liquid crystal that is near the lower and upper alignment layers 1 and 2, and in this instance, the polar angle α 1 of the liquid crystal provided in the first region U1 is greater than the polar angle α 2 of the liquid crystal that is provided in the second region U2. Therefore, since gamma curves of the first region U1 and the second region U2 are different, lateral visibility is improved when the optical characteristics between the different regions are efficiently compensated.

The present invention has been applied to the IPS mode liquid crystal display, and it is also applicable to the fringe field switching (FFS) mode liquid crystal display.

Figure 12:
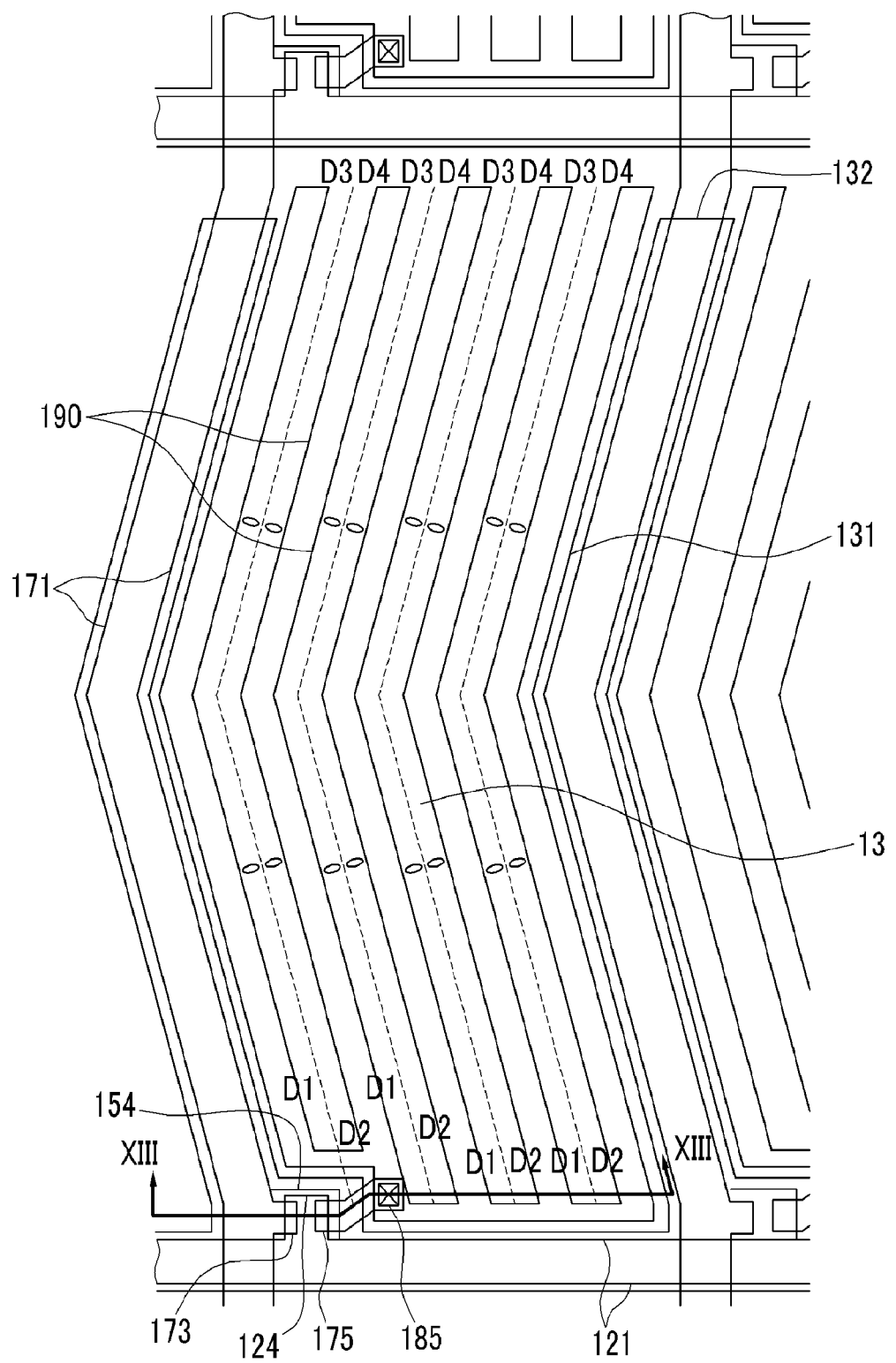
FIG. 12 shows a layout view of a liquid crystal display according to the other exemplary embodiment of the present invention.
Figure 13:
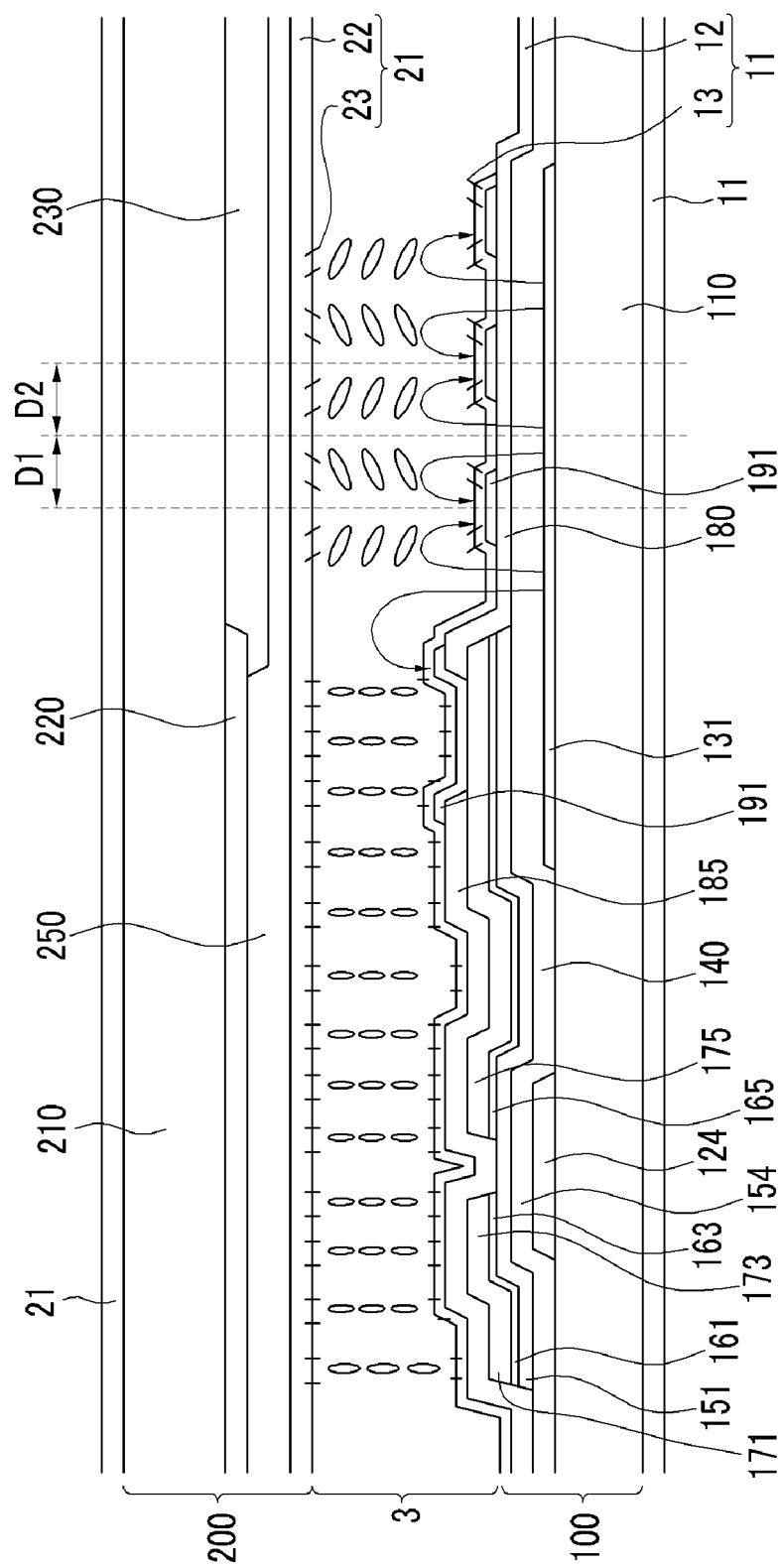
FIG. 13 shows a cross-sectional view of FIG. 12 with reference to line XII-XIII.

FIG. 12 shows a layout view of a liquid crystal display according to the other exemplary embodiment of the present invention, and FIG. 13 shows a cross-sectional view of FIG. 12 with reference to line XIII-XIII.

The liquid crystal display shown in FIG. 12 and FIG. 13 has almost the same structure as the liquid crystal display shown in FIG. 2 and FIG. 3, and the structure of the common electrode is different. The difference will now be mainly described.

A common electrode 130 is formed on the insulation panel 110, and the common electrode 130 includes a continuous surface in the pixel area without separated parts. The common electrode 130 is overlapped on a pixel electrode 190, and it has an opening 132 at a part where it is overlapped on the data line 171. The common electrode 130 can be made of a transparent conductive material such as indium tin oxide (ITO) or indium zinc oxide (IZO).

A passivation layer 180 is formed on a data line 171 having a plurality of source electrodes 173, a drain electrode 175, and a drain electrode 175, and the passivation layer 180 has a contact hole 185 exposing a part of the drain electrode 175. The pixel electrode 190 is connected to a part of the drain electrode 175 through the contact hole 185. The pixel electrode 190 has a plurality of bands and is formed in the vertical direction. The common electrode 130 and the pixel electrode 190 function as a domain dividing means, and a region between the common electrode 130 and the pixel electrode 190 is divided into a first domain D1 to a fourth domain D4 with reference to the first and second boundary lines P1 and P2. A lower alignment layer 1 is formed on the pixel electrode 190. The lower alignment layer 1 includes an alignment base layer 12 and an alignment control agent 13. The alignment base layer 12 is a liquid crystal vertical alignment layer of such as a polyamic acid, a polyimide, or lecithin, and the liquid crystal is basically aligned in the direction vertical to the panel by the alignment base layer 12. The alignment control agent 13 comes out of the alignment base layer 12 with a pretilt, particularly, a polar angle, and is formed by photo-polymerizing the photo-polymerizable monomer or oligomer.

Since the alignment base layer 12 of the lower alignment layer 1 is formed with the material that has the vertical alignment characteristic, the liquid crystal is vertically aligned in the earlier stage, but since the alignment control agent 13 of the lower alignment layer 1 has a pretilt with a predetermined polar angle with reference to the direction vertical to the surface of the insulation panel 110, alignment of the liquid crystal is changed by the alignment force of the alignment control agent 13, and the liquid crystal is tilted with a predetermined polar angle with reference to the direction vertical to the surfaces of the insulation panels 110 and 210.

A light blocking member 220 is formed on an insulation panel 210, and a color filter 230 is formed in respective regions divided by the light blocking member 220.

The color filter 230 and the light blocking member 220 can be formed on the thin film transistor panel 100.

An upper alignment layer 2 is formed on the color filter 230. The upper alignment layer 2 includes an alignment base layer 22 and an alignment control agent 23. The alignment base layer 22 is a liquid crystal vertical alignment layer of such as a polyamic acid, a polyimide, or lecithin, and the liquid crystal is basically aligned in the direction vertical to the panel by the alignment base layer 22. The alignment control agent 23 comes out of the alignment base layer 22 with a pretilt, particularly, a polar angle, and is formed by photo-polymerizing the photo-polymerizable monomer or oligomer.

The liquid crystal is initially vertically aligned since the alignment base layer 22 of the upper alignment layer 2 is formed with material having the vertical alignment characteristic, and since the alignment control agent 23 of the upper alignment layer 2 is tilted in a predetermined direction, alignment of the liquid crystal is changed by the alignment force of the alignment control agent 23, and the director of the liquid crystal is tilted with a predetermined polar angle off the surfaces of the panels 110 and 210.

The liquid crystal layer 3 includes liquid crystal with positive dielectric anisotropy, the alignment control agents 13 and 23 are tilted with a predetermined polar angle off the surfaces of the panels 110 and 210, and liquid crystal adjacent to the lower alignment layer 1 and the upper alignment layer 2 is tilted with a predetermined polar angle with reference to the surfaces of the panels 110 and 210 because of the influence by the alignment control agents 13 and 23 of the lower alignment layer 1 and the upper alignment layer 2.

Accordingly, when the liquid crystal that is near the lower alignment layer 1 and the upper alignment layer 2 has a pretilt with a predetermined polar angle, the response speed is fast because the liquid crystal in all the regions is immediately tilted according to the pretilt when the electric field is applied.

In the case of the IPS mode liquid crystal display, since the electric field provided in the region between the common electrode and the pixel electrode becomes smaller as it becomes distant from the common electrode and the pixel electrode, a threshold voltage is great to cause high power consumption, and since the common electrode and the pixel electrode are formed on a single panel, the aperture ratio becomes less. In order to solve the problem, the fringe field switching (FFS) mode liquid crystal display forms the common electrode on the continuous side in the pixel area to reinforce the intensity of the electric field, and forms the common electrode with a transparent conductor to improve the aperture ratio.

An exemplary embodiment of the present invention in which the liquid crystal alignment method according to the exemplary embodiment of the present invention is applied to a liquid crystal display of a vertical alignment (VA) mode will now be described.

Figure 14:
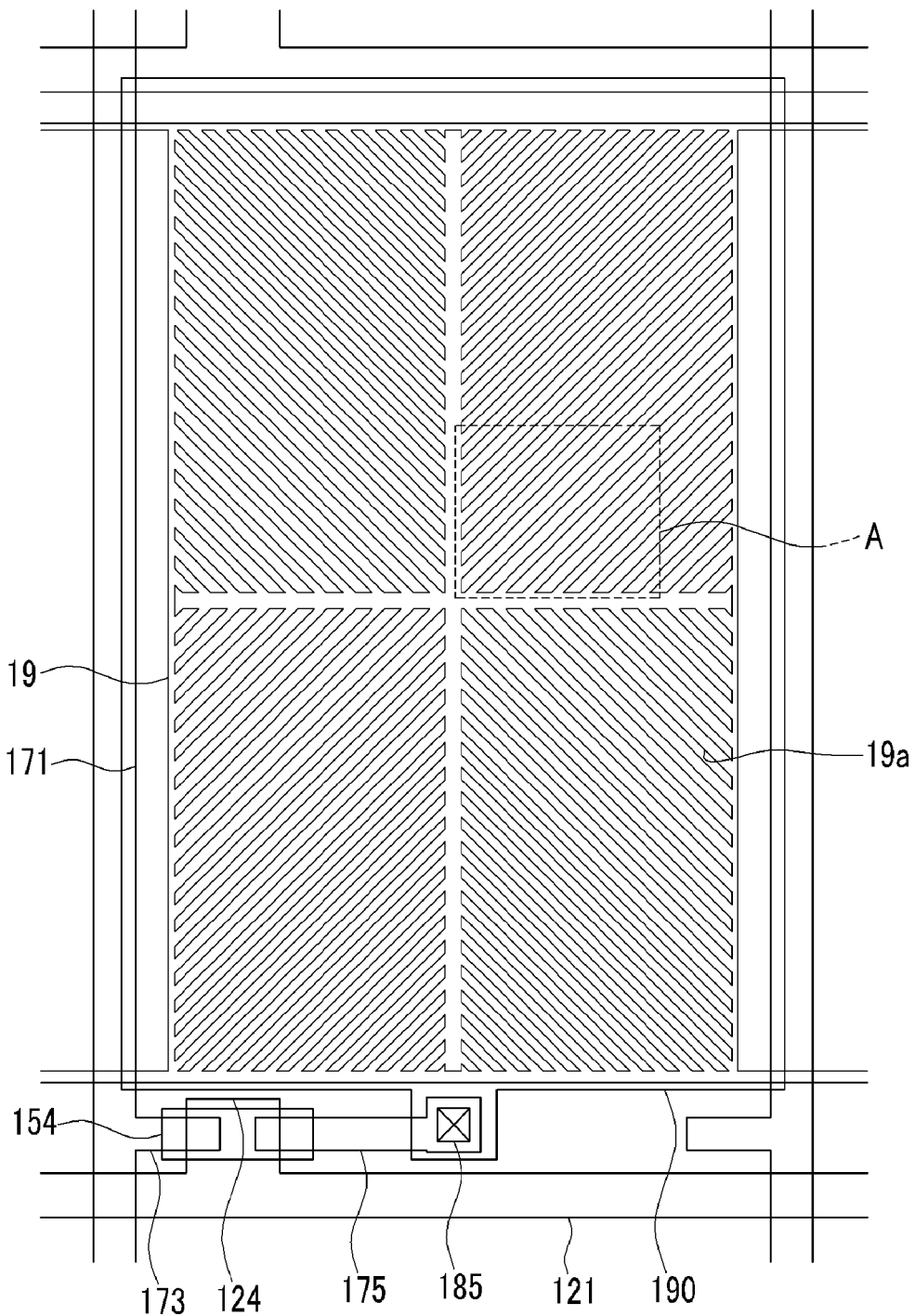
FIG. 14 shows a layout view of a liquid crystal display according to the other exemplary embodiment of the present invention.
Figure 15:
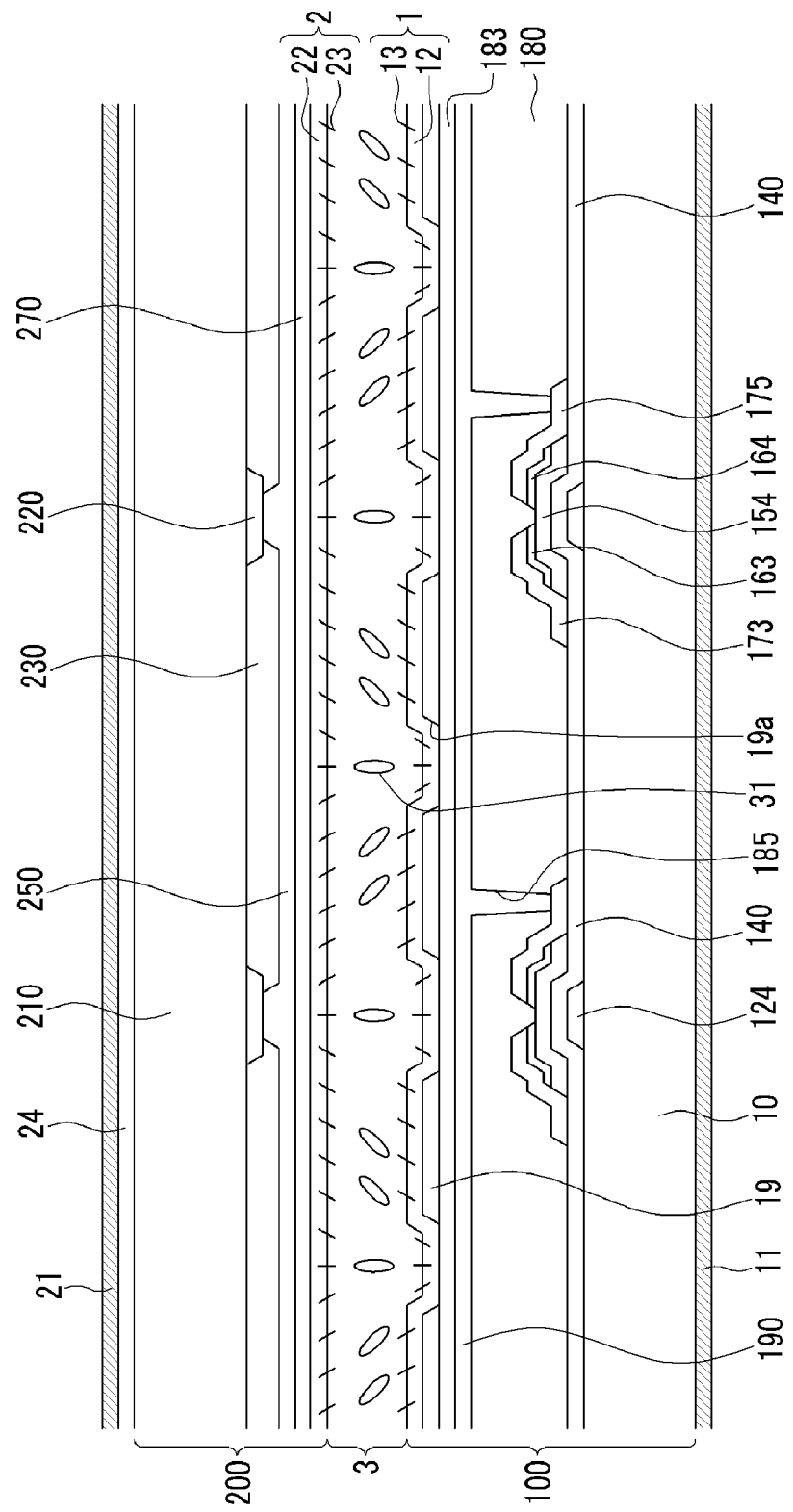
FIG. 15 shows a cross-sectional view of a liquid crystal display shown in FIG. 14.
Figure 16:
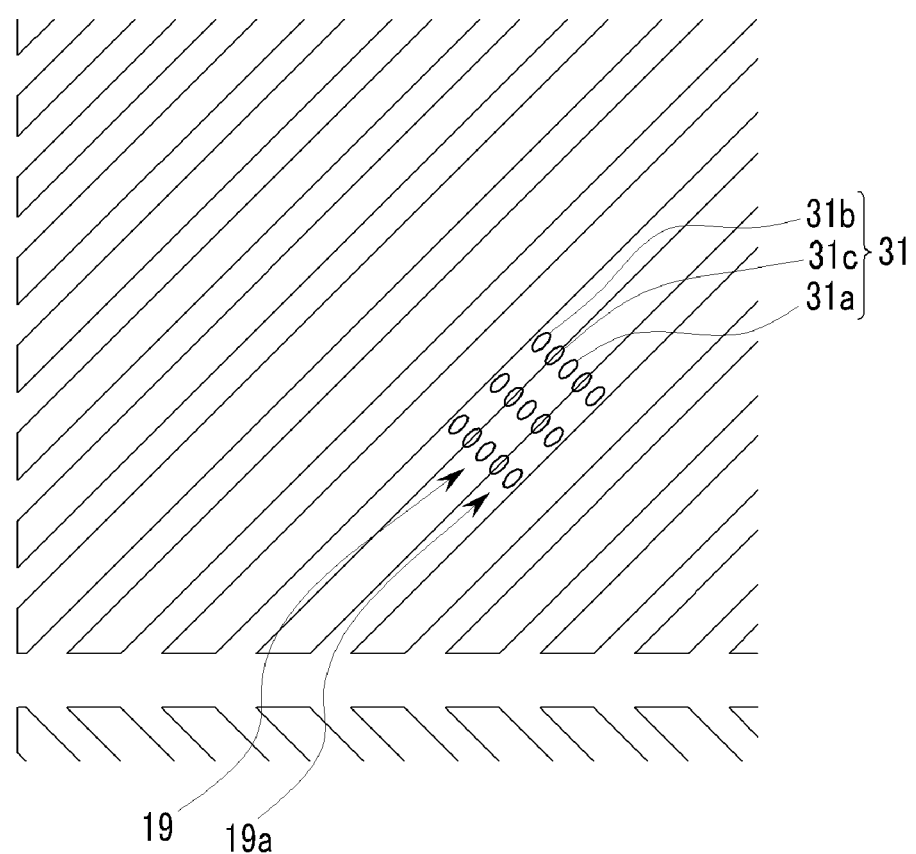
FIG. 16 shows alignment of liquid crystal provided at a control electrode and a cutout of the control electrode of a liquid crystal display shown in FIG. 14.

FIG. 14 shows a layout view of a liquid crystal display according to the other exemplary embodiment of the present invention, FIG. 15 shows a cross-sectional view of a liquid crystal display shown in FIG. 14, and FIG. 16 shows alignment of liquid crystal provided at a control electrode and a cutout of the control electrode of a liquid crystal display shown in FIG. 14.

The liquid crystal display according to the current exemplary embodiment of the present invention includes a thin film transistor panel 100, a common electrode panel 200, a liquid crystal layer 3, a lower polarizer 11, an upper polarizer 21, and a compensation film 24.

The thin film transistor panel 100 includes an insulation panel 110 and thin film layers formed thereon, and the common electrode panel 200 includes an insulation panel 210 and thin film layers formed thereon.

The thin film transistor panel 100 will now be described.

A gate electrode 124 is formed on the insulation panel 110 formed with transparent glass. The gate electrode 124 receives a scanning signal through the gate line 121.

A gate insulating layer 140 is formed on the gate electrode 124, an intrinsic semiconductor 154 made of amorphous silicon is formed on the gate insulating layer 140, and ohmic contacts 163 and 165 made of n+hydrogenated amorphous silicon in which silicide or an n-type impurity is doped in a high concentration are formed on the intrinsic semiconductor 154. The intrinsic semiconductor 154 and the ohmic contacts 163 and 165 can be called semiconductors for convenience of description, and the term semiconductor may signify a polysilicon semiconductor or an oxide semiconductor as well as the intrinsic semiconductor and the ohmic contact layer.

A plurality of source electrodes 173 and a drain electrode 175 are formed on the ohmic contacts 163 and 165. Each source electrode 173 receives an image signal voltage from the data line 171. The drain electrode 175 faces the source electrode 173 on the gate electrode 124. A channel of the intrinsic semiconductor 154 between the source electrode 173 and the drain electrode 175 is exposed.

The gate electrode 124, the source electrode 173, and the drain electrode 175 form a thin film transistor (TFT) together with the intrinsic semiconductor 154, and a channel of the thin film transistor is formed at the channel of the intrinsic semiconductor 154 between the source electrode 173 and the drain electrode 175.

A passivation layer 180 having a contact hole 185 is formed on the gate insulating layer 140, the source electrode 173, the drain electrode 174, and the channel of the intrinsic semiconductor 154. The passivation layer 180 is made of an inorganic insulating material such as silicon nitride or silicon oxide, or organic insulating material such as a resin.

A pixel electrode 190 having no cutout and forming a continuous surface is formed on the passivation layer 180. The pixel electrode 190 is connected to the drain electrode 175 through the contact hole 185, and it can be made of a transparent conductive layer such as indium tin oxide (ITO) or indium zinc oxide (IZO). The pixel electrode 190 receives a data voltage from the drain electrode 175.

An interlayer insulating layer 183 is formed on the pixel electrode 190. The interlayer insulating layer 183 is formed between the pixel electrode 190 and a control electrode 19 in order to prevent the pixel electrode 190 and the control electrode 19 from being shorted, and the interlayer insulating layer 183 can be made of an inorganic insulating material such as silicon nitride or silicon oxide, or an organic insulating material such as a resin.

The control electrode 19 is formed on the interlayer insulating layer 183. The control electrode 19 can be made of a transparent conductive layer such as indium tin oxide (ITO) or indium zinc oxide (IZO).

The control electrode 19 has a cutout 19a functioning as a domain dividing means. The cutout 19a previously controls the pretilt of the alignment control agent 13 in the azimuthal angle direction and previously controls the pretilt in the polar angle direction by controlling the electric field that is formed when a control voltage is applied between the control electrode 19 and the common electrode 270 during the manufacturing process, to have a horizontal component for the panel 210.

Therefore, when a driving voltage is applied between the pixel electrode 190 and a common electrode 270, the tilted direction of the liquid crystal is instantly determined according to the pretilt of the aligned alignment control agent 13, and the response speed is improved. Also, the cutout 19a of the control electrode 19 divides the liquid crystal layer 3 into regions by the alignment control agent 13, and controls the arrangement of the liquid crystal to have regularity in the respective divided regions to extend the viewing angle of the liquid crystal display. The lower alignment layer 1 is formed on the pixel electrode 190. The lower alignment layer 1 includes an alignment base layer 12 and an alignment control agent 13. The alignment base layer 12 is a liquid crystal alignment layer of such as a polyamic acid, a polyimide, lecithin, nylon, and polyvinylalcohol (PVA), and it can be made by including at least one of generally used materials. Therefore, the liquid crystal is basically aligned according to the characteristics of the alignment base layer 12. The alignment control agent 13 comes out of the alignment base layer 12, and it can be formed by photo-polymerizing the photo-polymerizable monomer or oligomer.

The alignment control agent 13 of the lower alignment layer 1 can have a pretilt that is tilted from the cutout 19a of the control electrode 19.

The common electrode panel 200 will now be described.

A light blocking member 220 is formed on the insulation panel 210 of transparent glass, and a color filter 230 is formed in respective regions divided by the light blocking member 220. An overcoat 250 is formed on the color filter 230, and a common electrode 270 is formed on the overcoat 250.

The common electrode 270 forms a continuous surface without a cutout.

The overcoat 250 can be omitted, and the color filter 230 and the light blocking member 220 can be formed on the thin film transistor panel 100.

An upper alignment layer 2 is formed on the common electrode 270. The upper alignment layer 2 includes an alignment base layer 22 and an alignment control agent 23. The alignment base layer 12 is a liquid crystal alignment layer of such as a polyamic acid, a polyimide, lecithin, nylon, and polyvinylalcohol (PVA), and it can be made by including at least one of generally used materials. Therefore, the liquid crystal is basically aligned according to the characteristics of the alignment base layer 22. The alignment control agent 23 comes out of the alignment base layer 22, and it can be formed by photo-polymerizing the photo-polymerizable monomer or oligomer.

The photo-polymerizable monomer or oligomer includes the reactive mesogen (RM), and NOA series by Norland as described above.

The alignment control agent 23 of the upper alignment layer 2 has a pretilt that is tilted in the same direction as the alignment control agent 13 of the lower alignment layer 1.

The liquid crystal layer 3 includes liquid crystal having negative dielectric anisotropy, it is vertically arranged by the alignment force of the alignment base layers 12 and 22 for the panels 110 and 210, and the liquid crystal that is near the lower alignment layer 1 and the upper alignment layer 2 has a pretilt because of an influence by the alignment control agent of the lower alignment layer 1 and the upper alignment layer 2.

Accordingly, when the liquid crystal has a pretilt, the response speed is very fast since the liquid crystal in all entire regions is immediately tilted in the pretilt direction when the electric field is applied. Therefore, the afterimage problem of the video is solved.

The liquid crystal molecules 31 of the liquid crystal layer 3 include liquid crystal molecules 31a provided on the control electrode 19, liquid crystal molecules 31b provided on the cutout 19a, and liquid crystal molecules 31c provided on the boundary of the control electrode 19 and the cutout 19a.

When the pixel electrode has a cutout, the electric field is not well applicable to the liquid crystal molecules 31 provided at the cutout of the pixel electrode, and hence, the liquid crystal molecules 31 provided at the cutout are not arranged in the direction of the electric field to generate texture and deteriorate the overall transmittance. However, in a like manner of the present exemplary embodiment, when a control electrode 19 having a cutout 19a on the pixel electrode 190 is formed and a control voltage is applied between the control electrode 19 and the common electrode 270, the liquid crystal molecules 31a provided on the control electrode 19, the liquid crystal molecules 31b provided on the cutout 19a, and the liquid crystal molecules 31c provided on the boundary of the control electrode 19 and the cutout 19a have a pretilt by the alignment control agent 13. Therefore, when the driving voltage is applied between the pixel electrode 190 and the common electrode 270, the liquid crystal molecules 31b provided at the cutout 19a and the liquid crystal molecules 31c provided on the boundary of the control electrode 19 and the cutout 19a are immediately tilted in the direction in parallel with, the electric field, and hence, liquid crystal that is helpful for image displaying is increased. Therefore, the aperture ratio is improved and luminance is increased.

The lower alignment layer 1 and the upper alignment layer 2 have been described to have the alignment base layers 12 and 22 and the alignment polymers 13 and 23, and it is also possible for one of the lower alignment layer 1 and the upper alignment layer 2 to have the alignment base layer and the alignment polymer, and for the other one thereof to have the alignment base layer.

The lower polarizer 11 and the upper polarizer 21 can be disposed to have transmissive axes crossed with each other.

The compensation film 24 can be a phase delay film such as a ¼ wavelength delay film or a ½ wavelength delay film. The compensation film 24 can be plural or can be omitted.

A method for manufacturing a liquid crystal display of FIG. 14 and FIG. 15 according to another exemplary embodiment of the present invention will now be described with reference to FIG. 17 and FIG. 18.

Figure 17:
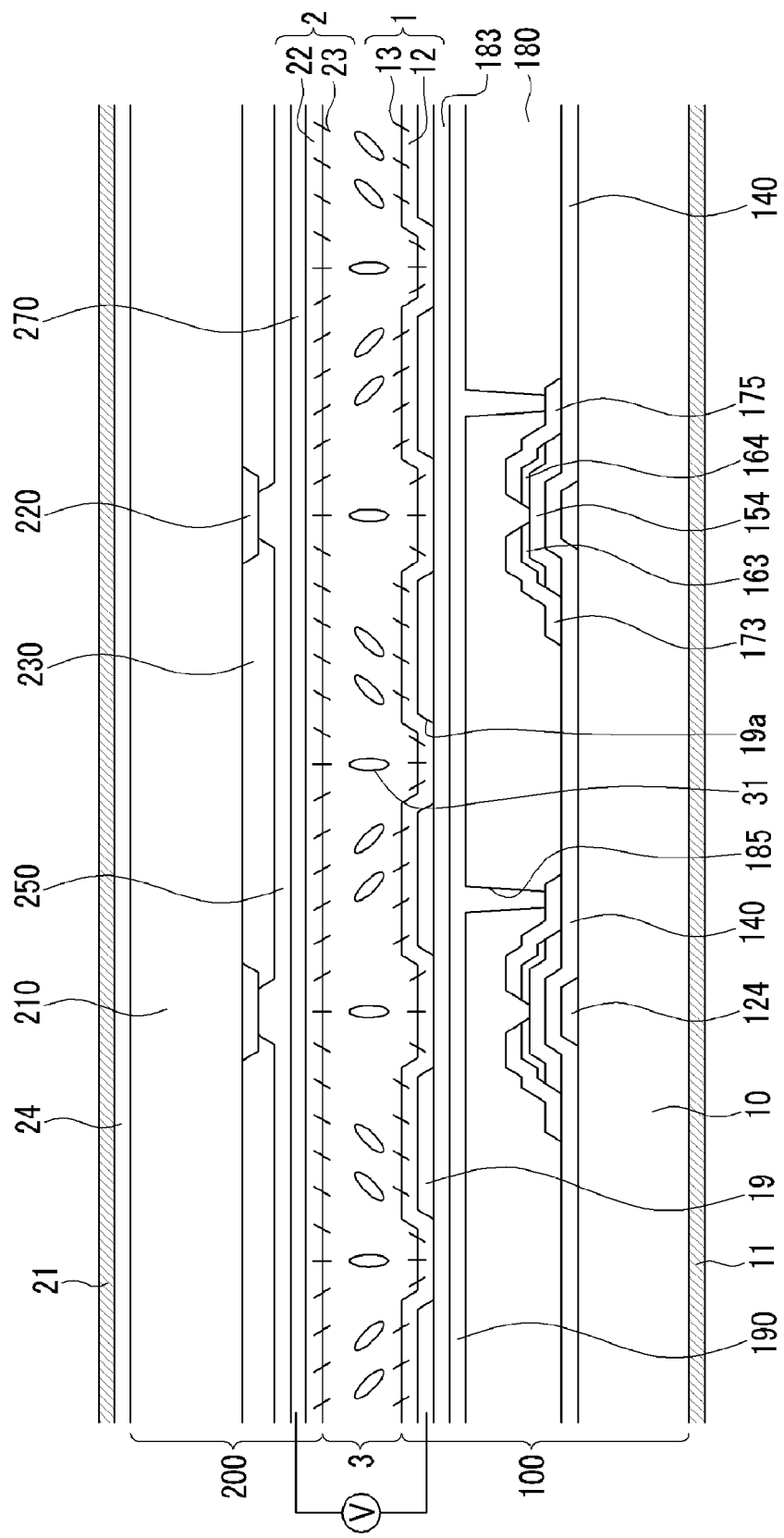
FIG. 17 shows a cross-sectional view for aligning liquid crystal to have a pretilt by applying a control voltage between a control electrode and a common electrode according to another exemplary embodiment of the present invention.

FIG. 17 shows a cross-sectional view for aligning liquid crystal to have a pretilt by applying a control voltage between a control electrode and a common electrode according to another exemplary embodiment of the present invention, and FIG. 18 shows a cross-sectional view for aligning an alignment control agent to have a pretilt by irradiating ultraviolet (UV) to liquid crystal having a pretilt according to the exemplary embodiment of the present invention.

First, as shown in FIG. 17, a thin film layer including wiring, a thin film transistor, a control electrode 19 having a cutout 19a, and a pixel electrode 190 having no cutout and forming a continuous surface on the insulation panel 110 is formed by using thin film deposition, photolithography, and photo-etching. Also, a thin film layer including a light blocking member 220, a color filter 230, and a common electrode 270 having no cutout and forming a continuous surface is formed on an insulation panel 210 by using thin film deposition, photolithography, and photo-etching.

Next, a ground material and a photo-polymerizable monomer or oligomer are mixed and coated on the thin film layer of the thin film transistor panel 100, and the alignment ground material is hardened by curing the same at a temperature (100 to 180 degrees Celsius) for 0.5 to 1 hour, thereby forming a lower alignment layer 1 including the photo-polymerizable monomer or oligomer. Also, the alignment ground material and the photo-polymerizable monomer or oligomer are mixed and coated on the thin film layer of the facing panel 200, and the alignment ground material is hardened by curing the same at a temperature (100 to 180 degrees Celsius) for 0.5 to 1 hour, thereby forming an upper alignment layer 2 including the photo-polymerizable monomer or oligomer.

Here, the alignment ground material is a liquid crystal vertical alignment layer of such as a polyamic acid, a polyimide, or lecithin, and the liquid crystal is firstly aligned in the direction vertical to the panel by the alignment ground material. Therefore, the lower alignment layer 1 and the upper alignment layer 2 including the photo-polymerizable monomer or oligomer can firstly align the liquid crystal in the direction vertical to the panels 100 and 200 by the alignment ground material. The photo-polymerizable monomer or oligomer includes the reactive mesogen (RM) and NOA series by Norland as described.

Then, the thin film transistor panel 100 and the facing panel 200 are combined. The panels 100 and 200 can be combined by two methods.

The first method is to coat a sealant on one of the thin film transistor panel 100 and the facing panel 200 to define a region in which the liquid crystal is filled, drip the liquid crystal into the defined region, and arrange and combine the thin film transistor panel 100 and the facing panel 200. In this instance, a spacer for maintaining a gap between the two panels 100 and 200 can be sprayed before or after the liquid crystal is dripped. The spacer can be formed on the thin film transistor panel 100 and the facing panel 200 through a thin film formation process in advance. In this instance, the liquid crystal can be dripped after adding the photo-polymerizable monomer or oligomer thereto.

In another way, a sealant is coated on one of the thin film transistor panel 100 and the facing panel 200 to define a region in which liquid crystal will be filled, a liquid crystal interposition hole is formed, and then the two panels 100 and 200 are arranged and combined. The liquid crystal can be interposed by dipping the liquid crystal interposition hole in a liquid crystal storage tank in a vacuum state and eliminating the vacuum, and then the liquid crystal interposition hole can be sealed. Further, the liquid crystal can be interposed by adding the photo-polymerizable monomer or oligomer to the liquid crystal.

A control voltage (V) is applied between the control electrode 19 and the common electrode 270 to form an electric field between the cutout 19a of the control electrode 19 and the common electrode 270. Since the liquid crystal has positive dielectric anisotropy, the liquid crystal is tilted in the direction in parallel with the electric field, and the liquid crystal has a pretilt.

Next, as shown in FIG. 18, light such as the ultraviolet rays is irradiated to the lower and upper alignment layers 1 and 2 to photo-polymerize the photo-polymerizable monomer or oligomer, thereby forming alignment control agents 13 and 23 coming out of the alignment base layers 12 and 22. The alignment control agents 13 and 23 have a pretilt with a predetermined polar angle according to the secondary alignment state of the liquid crystal.

Accordingly, when the liquid crystal has a pretilt, the response speed is very fast since the liquid crystal of all regions is immediately tilted in the pretilt direction when the electric field is applied between the pixel electrode 190 and the common electrode 270. Therefore, the problem of after-image of the motion picture can be solved.

Further, since the liquid crystal has a pretilt of a predetermined azimuthal angle by the control electrode 19 having the cutout 19a, when the electric field is applied between the pixel electrode 190 and the common electrode 270, the liquid crystal molecules 31b provided at the cutout 19a and the liquid crystal molecules 31c provided on the boundary of the control electrode 19 and the cutout 19a are immediately tilted in a predetermined azimuthal angle direction, and hence, liquid crystal that is helpful for image displaying is increased. Therefore, the aperture ratio is improved and the luminance is increased.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal display comprising:
a first panel;
a second panel facing the first panel;
a first electrode and a second electrode formed on the first panel;
a liquid crystal layer provided between the first panel and the second panel; and a first alignment layer formed on the first panel and contacting the liquid crystal layer, wherein the first alignment layer includes a first alignment base layer and a plurality of first alignment control agents, the first alignment base layer aligning liquid crystals of the liquid crystal layer in a vertical direction with respect to a surface of the first panel, and the first alignment control agents come out of the first alignment base layer and provide alignment force to the liquid crystals to be pre-tilted in a different direction from the vertical direction wherein a region between the first electrode and the second electrode is divided into a plurality of domains including first domains, second domains, third domains and fourth domains which are classified according to directors of the liquid crystals included therein, wherein the plurality of domains are divided into a first region and a second region respectively including at least one of the first domains, at least one of the second domains, at least one of the third domains, and at least one of the fourth domains, and wherein absolute value of a polar angle of each of the first alignment control agents provided in the first region is greater than absolute value of a polar angle of each of the first alignment control agents provided in the second region, where the polar angle is defined as an angle formed between the first alignment control agent and the surface of the first panel.

2. The liquid crystal display of claim 1, wherein the first electrode and the second electrode are formed as a plurality of bands, and are alternately disposed.

3. The liquid crystal display of claim 1, wherein the first electrode and the second electrode are in parallel with each other, and the middle parts thereof are bent.

4. The liquid crystal display of claim 1, wherein the first alignment control agent is generated by polymerizing a photo-polymerizable monomer or oligomer.

5. The liquid crystal display of claim 1, wherein the liquid crystal display further includes
   a second alignment layer formed on the second panel and contacting the liquid crystal layer, and
   the second alignment layer includes a second alignment base layer and a second alignment control agent, the second alignment base layer represents a material for vertically aligning liquid crystal of the liquid crystal layer, and the second alignment control agent comes out of the second alignment base layer and provides alignment force to the liquid crystal.

6. The liquid crystal display of claim 5, wherein the second alignment control agent is generated by polymerizing a photo-polymerizable monomer or oligomer.

7. The liquid crystal display of claim 6, wherein a polar angle of the second alignment control agent provided in the first region is different from a polar angle of the second alignment control agent provided in the second region.

8. The liquid crystal display of claim 7, wherein the first alignment layer and the second alignment layer are optical alignment layers.

9. The liquid crystal display of claim 1, wherein the first electrode is formed as a plurality of bands, and the second electrode is formed with a continuous surface in a pixel area.

10. The liquid crystal display of claim 9, wherein the second electrode is formed with a transparent conductor.

11. The liquid crystal display of claim 10, wherein a region between the first electrode and the second electrode is divided into a plurality of domains.

12. The liquid crystal display of claim 11, wherein the plurality of domains are divided into a first region and a second region, and
   a polar angle of the first alignment control agent provided in the first region is different from a polar angle of the first alignment control agent provided in the second region.

13. The liquid crystal display of claim 12, wherein the first alignment control agent is generated by polymerizing a photo-polymerizable monomer or oligomer.

14. The liquid crystal display of claim 11, wherein the middle of the first electrode is bent.

15. The liquid crystal display of claim 12, wherein the liquid crystal display further includes
   a second alignment layer formed on the second panel and contacting the liquid crystal layer,
   wherein the second alignment layer includes a second alignment base layer and a second alignment control agent, the second alignment base layer represents a material for vertically aligning liquid crystal of the liquid crystal layer, and the second alignment control agent comes out of the second alignment base layer and provides alignment force to the liquid crystal.

16. The liquid crystal display of claim 15, wherein the second alignment control agent is generated by polymerizing a photo-polymerizable monomer or oligomer.

17. The liquid crystal display of claim 16, wherein a polar angle of the second alignment control agent provided in the first region is different from a polar angle of the second alignment control agent provided in the second region.

18. The liquid crystal display of claim 17, wherein the first alignment layer and the second alignment layer are optical alignment layers.

* * * * *